United States Patent
Baumgarten et al.

(10) Patent No.: US 9,238,427 B2
(45) Date of Patent: Jan. 19, 2016

(54) HEAD RESTRAINT WITH AN AUTOREACTIVE FRAMEWORK STRUCTURE

(71) Applicant: SITECH SITZTECHNIK GMBH, Wolfsburg (DE)

(72) Inventors: Jens Baumgarten, Braunschweig (DE); Martin Buchenberger, Wendeburg (DE); Damien Devolder, Braunschweig (DE); Tomas Barkow, Braunschweig (DE); Anne Cordes, Wesendorf (DE); Martin Fischer, Wolfsburg (DE); Thomas Nitsche, Wolfsburg (DE)

(73) Assignee: Sitech Stiztechnik GmbH, Wolfsburg (DE)

( * ) Notice: Subject to any disclaimer, the term of this patent is extended or adjusted under 35 U.S.C. 154(b) by 38 days.

(21) Appl. No.: 14/054,183

(22) Filed: Oct. 15, 2013

(65) Prior Publication Data

US 2014/0077565 A1 Mar. 20, 2014

Related U.S. Application Data

(63) Continuation of application No. PCT/EP2012/001582, filed on Apr. 12, 2012.

(30) Foreign Application Priority Data

Apr. 13, 2011 (DE) .......................... 10 2011 016 959

(51) Int. Cl.
*A47C 7/36* (2006.01)
*B60N 2/48* (2006.01)

(52) U.S. Cl.
CPC ............ *B60N 2/4885* (2013.01); *B60N 2/4805* (2013.01); *B60N 2/4882* (2013.01)

(58) Field of Classification Search
CPC .......... A47C 7/38; B60N 2/48; B60N 2/4882; B60N 2/4885; B60N 2/4805
See application file for complete search history.

(56) References Cited

U.S. PATENT DOCUMENTS

| | | | | |
|---|---|---|---|---|
| 2,864,433 | A * | 12/1958 | Schnoor | ........................ 297/404 |
| 6,513,871 | B2 * | 2/2003 | Bartels | ...................... 297/216.12 |
| 8,857,904 | B2 * | 10/2014 | Gaeng et al. | ............. 297/216.12 |
| 2010/0072795 | A1 * | 3/2010 | Meixner et al. | .......... 297/216.12 |
| 2010/0295347 | A1 | 11/2010 | Marsden et al. | |

FOREIGN PATENT DOCUMENTS

| | | |
|---|---|---|
| DE | 23 39 357 A1 | 2/1975 |
| DE | 10 2005 054 125 B3 | 5/2007 |

(Continued)

*Primary Examiner* — Philip Gabler
(74) *Attorney, Agent, or Firm* — Muncy, Geissler, Olds & Lowe, P.C.

(57) ABSTRACT

A head restraint with a basic structure which serves to adjust the head restraint and to receive a person's head. The basic structure has a holding structure and at least one framework structure, wherein the framework structure has flexurally elastic flanks and deflectable cross struts which lie between the flanks and are arranged on the flanks via an elastic connector, as a result of which a force pulse which acts on the cross struts of the at least one framework structure via a flexurally elastic flank and which acts on a front side of the at least one framework structure from one direction causes a compensating, autoreactive deformation of the at least one framework structure at another point in the opposite direction.

26 Claims, 17 Drawing Sheets

(56) References Cited

FOREIGN PATENT DOCUMENTS

| | | |
|---|---|---|
| DE | 10 2006 032891 A1 | 1/2008 |
| DE | 10 2009 033 883 A1 | 1/2011 |
| EP | 0142822 * | 5/1985 |
| EP | 1 040 999 A2 | 10/2000 |
| EP | 1 316 651 A2 | 6/2003 |
| EP | 2 253 503 A1 | 11/2010 |

* cited by examiner

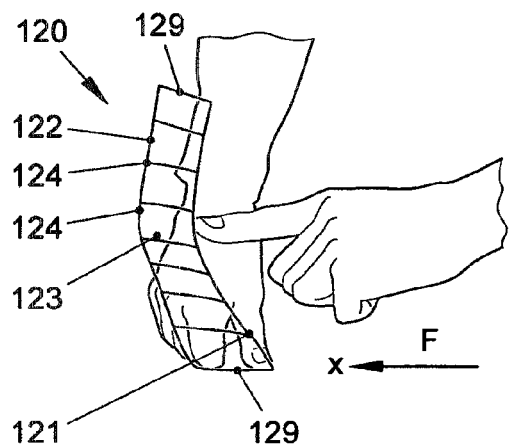
FIG. 2A
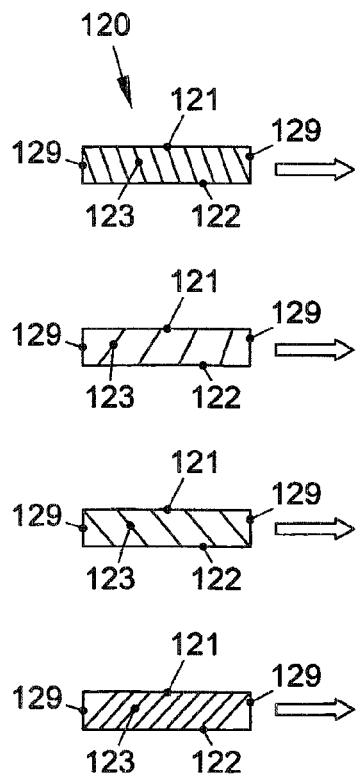 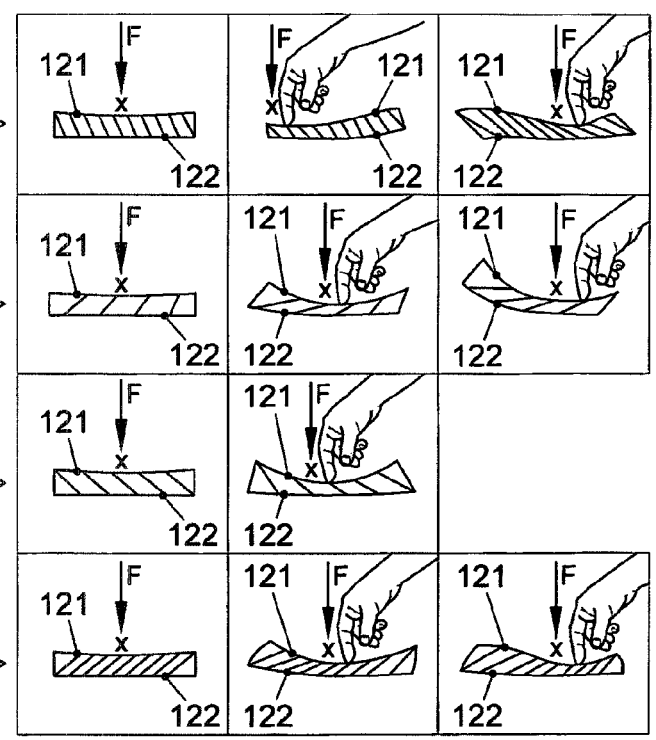
FIG. 2B            FIG. 2C

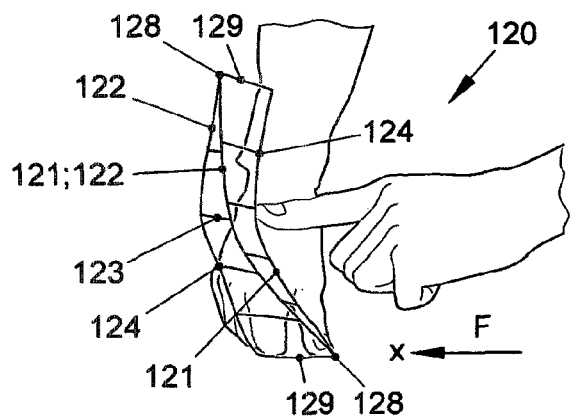
FIG. 3A
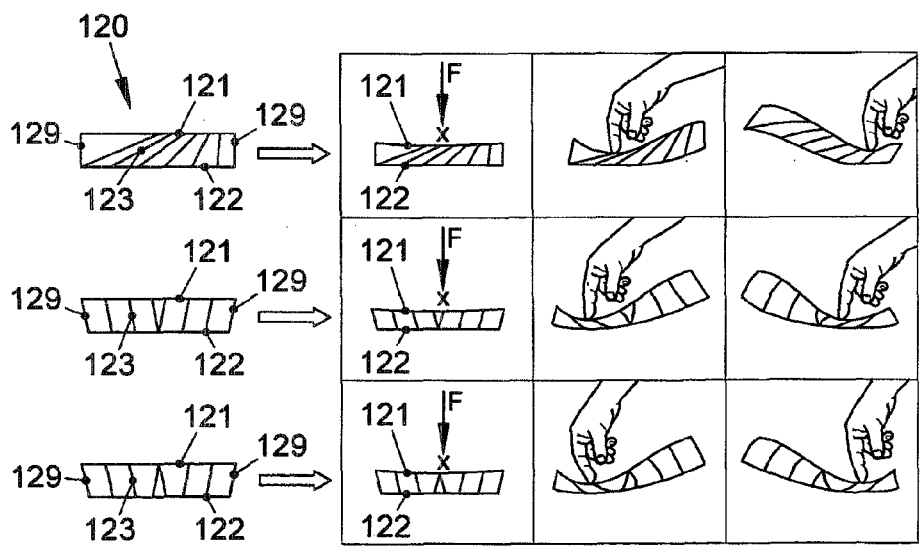
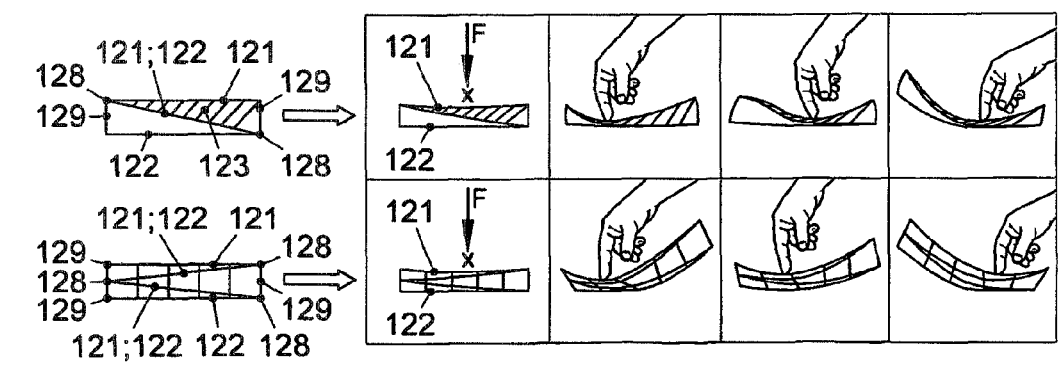
FIG. 3B  FIG. 3C

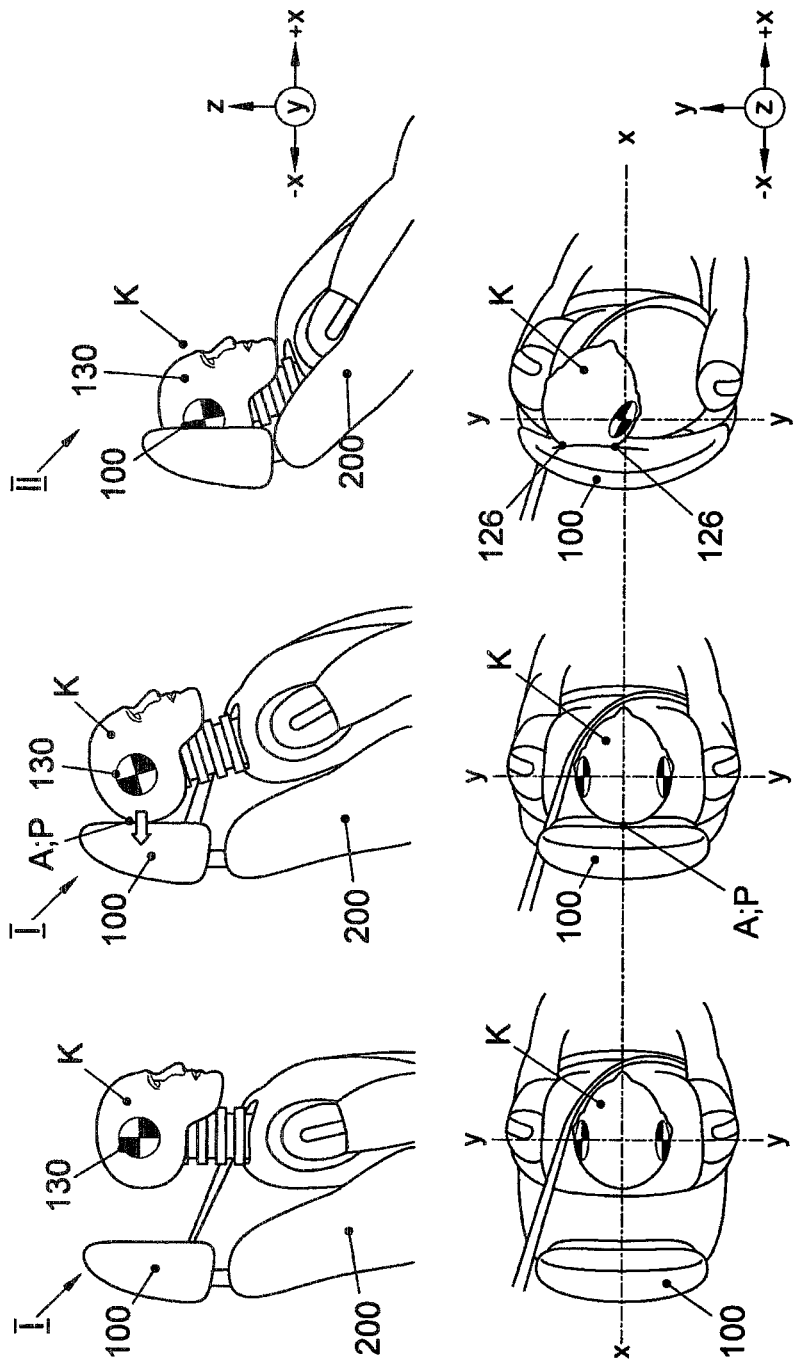

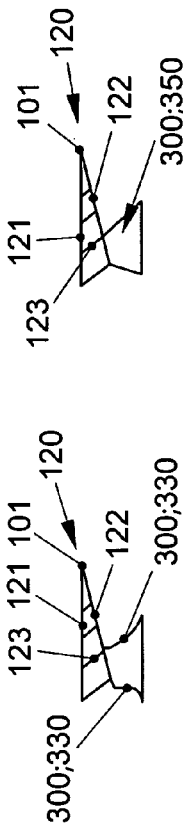
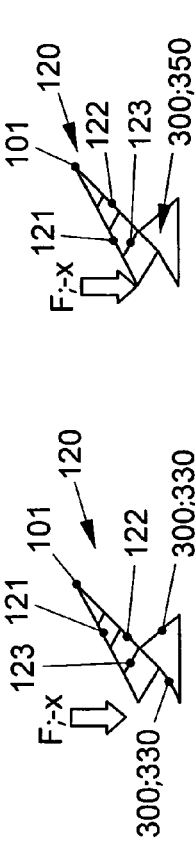
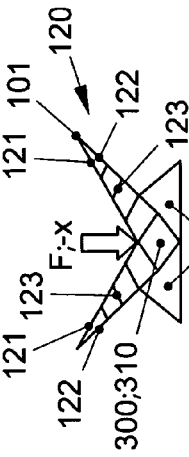
FIG. 17A
FIG. 17B
FIG. 17C
FIG. 17D
FIG. 18A
FIG. 18B
FIG. 18C
FIG. 19A
FIG. 19B
FIG. 19C
FIG. 19D

HEAD RESTRAINT WITH AN AUTOREACTIVE FRAMEWORK STRUCTURE

This nonprovisional application is a continuation of International Application No. PCT/EP2012/001582, which was filed on Apr. 12, 2012, and which claims priority to German Patent Application No. DE 10 2011 016 959.8, which was filed in Germany on Apr. 13, 2011, and which are both herein incorporated by reference.

BACKGROUND OF THE INVENTION

1. Field of the Invention

The present invention relates to a head restraint with a basic structure which serves to adjust the head restraint and to receive a person's head.

2. Description of the Background Art

"Function-integrated, bionic car seats" are known from the prior art. The particular feature of these seats lies in the design of the backrest, which utilizes a fin ray principle. The use of this principle and the basic structure, the so-called fin ray structure, have already been described in EP 1 040 999 A2 for the construction of structural elements, such as backrests and seat areas.

A fin ray principle can be observed in fish. It is based on the special structure of the fin rays of fish. When a point is pressed, the principle causes the fin ray to move opposite to this pressure direction. The fin ray reacts to the pressure with counterpressure. This becomes possible because of the special structure of the fin ray with two flexible struts, which converge at a tip and there grow together solidly. Cross struts, which keep the flanks at a distance and allow elastic movements, are located between the two elastic flanks. If the tail ray is held firmly at the base and the middle of the fin blade is pressed with a finger, the fin tip contrary to expectations moves opposite to the pressing direction of the finger.

This operating principle was realized technically in a backrest structure of a car seat in the following manner: Two flexible flanks made of thermoplastic fiberglass composite (a so-called organic sheet) form the front and back of the backrest. These are attached at the bottom to the backrest base, run together tapering upwards, where their ends are connected. Struts attached in an articulated manner to the flanks connect the front and back sides and keep these at a distance. Such a backrest also provides support in the lumbar area, yields in the shoulder region mostly toward the back, and thereby simultaneously reduces the distance of a head cushion of a head restraint to the head of a seat occupant. In large displacements, as may also occur, for example, in a rear-end collision, whiplash injury can be effectively countered with the aid of such a backrest structure. Thus, an anti-whiplash effect in the head area can be achieved with such a backrest structure.

A vehicle seat that utilizes the fin ray principle is described in the publication DE 10 2005 054 125 B3. The backrest frame of the vehicle seat comprises a construction built on the fin ray principle in a frame-like fashion; the construction comprises a rigid rear wall, a flexibly formed plate-like front wall, and cross struts arranged between them. The cross struts extend in their longitudinal direction along the vehicle seat width direction. The front wall and rear wall, in contrast, have a longitudinal extension in the vehicle height direction. The publication provides a backrest of a vehicle seat, which can be deformed in a simple way by using the fin ray principle both in the lumbar and in the shoulder region with mutual interdependence.

Thus far, in the automotive sector it was only envisaged to develop a backrest whose upper part functions as a head restraint in a crash. The upper part of the backrest moves forward in the crash and thus prevents the head from falling backwards and the cervical spine from hyperextending. As mentioned above in the event of a crash, the so-called anti-whiplash effect is achieved thereby for the head of a vehicle occupant.

SUMMARY OF THE INVENTION

It is therefore an object of the present invention to provide a single head restraint with a basic structure which serves to adjust the head restraint and to receive a person's head. The use of a fin ray principle for the head restraint is also provided according to an embodiment of the invention.

The head restraint of the invention with a fin ray design and the mode of action according to the fin ray principle is intended to be used not only in passenger vehicles but its application is also proposed for all vehicles, for example, also airplanes, buses, trains, and ships, or the like.

The head restraint according to the invention is given a fin ray structure or, in other words, an intelligent reactive structure, which functions or reacts using bionic approaches, as will be explained hereafter.

According to an embodiment of the invention, a support structure and the autoreactive structure in the nature of the fin ray design are proposed for the basic structure of the head restraint, whereby the autoreactive structure has a function that operates according to the explained fin ray principle.

It is provided that the basic structure comprises the support structure and the at least one autoreactive framework-like structure, called a framework structure below, whereby the framework structure has flexurally elastic flanks and deflectable cross struts which lie between the flanks and are arranged on the flanks via an elastic connector, as a result of which a force pulse which acts on the cross struts of the at least one framework structure via a flexurally elastic flank and which acts on a front side of the framework structure from one direction causes a compensating, autoreactive deformation of the at least one framework structure at another point in the opposite direction.

In an embodiment of the invention, the force acting in a direction generates the force pulse, which is transmitted via a person's head with the formation of a point of impact of the head or an area of impact of the head on the front side of the framework structure. The head restraint is adjusted in the opposite direction at another point, in a horizontal line transverse to the direction of the acting force, at least on one side to the side of the point of impact or to the area of impact of the force pulse.

The framework structure via the autoreactive adjustment to the side of the point of impact or area of impact of the force pulse in the opposite direction to the force pulse forms a type of side wing.

Contrary to the prior art, particularly a changed orientation of the framework structure is provided. In an embodiment of the invention, the flexurally elastic flanks of the at least one framework structure in the head restraint can be arranged in a transverse direction in a horizontal line transverse to the direction of the force producing the force pulse. In a further preferred embodiment of the invention, the cross struts of the at least one framework structure in the head restraint are arranged substantially in the vertical direction in the vertical line transverse to the direction of the force producing the force pulse.

In a further embodiment of the invention, the second flexurally elastic flank of the at least one framework structure can be connected at least partially to the support structure.

It is provided further to generate different, desired deformations of the framework structure that the framework structures have a triangular or a rectangular shape, whereby a plurality of framework structures of the same shape or different shapes can be assembled to form a multi-framework structure.

In an embodiment of the invention it is proposed that the at least one framework structure, connected to the support structure, of the head restraint can be arranged on a backrest as a single head restraint via the support rods, connected to the support structure, or the at least one framework structure of the head restraint is integrated into a structure of a backrest.

In an embodiment of the invention, separate "comfort side wings," which are attached to the support structure, can be formed as the autoreactive framework structure. It is provided that the at least one framework structure is used to form the side wings, arranged on a support element of the support structure, whereby the side wings can be brought autoreactively out of a starting position into a comfort position and back in the direction of travel.

A cushion element, which is a foam part provided with a cover, can be arranged on the framework structure.

It is provided, in addition, that the framework structure of the side wings and the cushion element can be formed as a separate fin ray cushion element separable from the head restraint.

It is provided further that a sliding plane can be formed between the framework structure and the cushion element, whereby the sliding plane is arranged between a rear side of the cushion element and a front side of the framework structure of the side wings, in which the facing and adjacent areas of the back of the cushion element and the front side of the framework structure form a friction pair with a low friction coefficient.

In an embodiment of the invention, the foam part of the head restraint can be formed by a middle foam part and each side wing by an edge foam part and/or a corner foam part. In a preferred embodiment variant, the middle foam part is made of a softer foam and the edge foam part and/or the corner foam part of a harder foam, compared with the middle foam part made of the softer foam. In a further embodiment variant, the middle foam part can be made of a softer viscoelastic foam and the edge foam part and/or the corner foam part of a harder viscoelastic foam, compared with the softer viscoelastic foam of middle foam part. The associated advantageous effects are described in the description.

The support structure for receiving the framework structure of the side wings can have a trough-shaped formation.

It is provided further that the deflectable cross struts, lying between the flexurally elastic flanks, close to the flexurally elastic flanks form hinge sites or joint sites, whose elasticity is influenced in an advantageous manner by a performed material weakening.

To increase comfort further, it is proposed in an embodiment that the framework structure of the side wings in their starting position takes on a "V shape," in which the side wings in the bottom area emerge "dish-like" forward toward an occupant's head from a plane in the normal installation position in the direction of travel.

The framework structure of the side wings in a further embodiment in their starting position forms a contact area for the head in the "V shape," in that the side wings of the framework structure in their starting position lie in a plane, but at least in the bottom area of the side wings on the framework structure at least one foam part is arranged, emerging "dish-like" forward toward an occupant's head.

In an embodiment of the head restraint, the "dishing" is provided in that at least one corner foam part is arranged on the framework structure of each side wing, as a result of which in the starting position of the head restraint, in which the side wings lie in one plane, a dishing of the contact area of the head can be effected.

Further, an embodiment of the framework structure has proven advantageous in that, proceeding from an axially symmetric central axis of the head restraint or the side wings, a distance and/or length of the cross struts, oriented vertically between the flexurally elastic flanks in the normal installation state of the head restraint, decrease from inside to the outside.

It is proposed to improve the stability of the framework structure that a bottom area of the framework structure of the side wings is made reinforced and/or has stiffening.

In addition, according to an embodiment of the invention, the side wings, formed as the framework structure, on the front side of the framework structure in the area of the central axis can have an opening, in which an absorbing element accessible from the front side is arranged, which is a foam part, particularly in the fashion of a "pressure mushroom," whereby in particular a viscoelastic foam is used.

An advantageous effect, which is achieved by the use of the viscoelastic foam, will be described in greater detail in the following exemplary embodiment.

It is proposed, in addition, that the framework structure of the side wings has reinforcing elements, which increase an adjustment path of the side wings from the starting position to the comfort position and back, which will also be discussed in greater detail in the associated exemplary embodiment.

In an embodiment variant the head restraint can be arranged pivotable on a head restraint pivot axis relative to a backrest, whereby the position of the head restraint relative to the backrest and thereby the position of the framework structure depending on the backrest tilt can be adjusted further manually or automatically to a more optimal position.

In another embodiment variant, the framework structure can be arranged pivotable on a framework structure pivot axis relative to the support element, whereby the position of the framework structure relative to the support element and thereby relative to the backrest depending on the backrest tilt can be adjusted further manually or automatically to a more optimal position.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 2A is a schematic illustration of a deformation of a rectangular autoreactive framework structure under the action of a force;

FIG. 2B is a schematic illustration of different variants of rectangular autoreactive framework structures;

FIG. 2C is an illustration of the deformation behavior of the autoreactive framework structures shown schematically in FIG. 2B;

FIG. 3A is a schematic illustration of a deformation of an autoreactive framework structure, combining various shapes, under the action of a force;

FIG. 3B is a schematic illustration of different variants with specifically formed and combined autoreactive framework structures;

FIG. 3C is an illustration of the deformation behavior of the autoreactive framework structures shown schematically in FIG. 3B;

FIGS. 6A, 6B, and 6C is a crash-active head restraint, activatable by a force pulse by the head of a vehicle seat user, with the basic structure having the autoreactive framework structure;

FIGS. 17A to 17D, FIGS. 18A to 18C, and FIGS. 19A to 19D illustrate reinforcement structures for increasing the effect of the adjustment movement of the side wings, formed as the autoreactive framework structure, in several different design options.

DETAILED DESCRIPTION

The invention will be described below. For the purposes of the present description, the conventional direction of travel of a vehicle is designated with "+x" ("plus x"), and the direction opposite to its conventional direction of travel with "−x" ("minus x"); the direction in the horizontal line transverse to the x-direction is designated with "y" and the direction in the vertical line transverse to the x-direction with "z." This terminology for the spatial directions in Cartesian coordinates corresponds to the coordinate system generally used in the automotive industry.

If an "autoreactive" structure is discussed below, then this means a "reactive" framework structure, which by using bionic approaches obeys the previously described fin ray principle and automatically alters its form due to an acting force pulse.

Figure 1A:
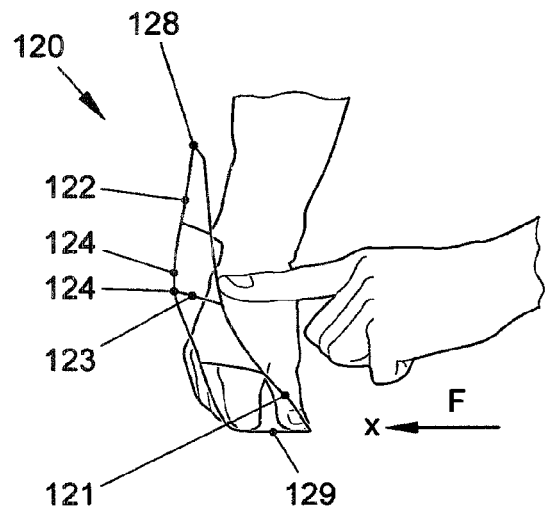
FIG. 1A is a schematic illustration of a deformation of a triangular autoreactive framework structure under the action of a force.

Various Embodiments of Autoreactive Framework Structures 120 for Use in a Head Restraint 100 are Described Below:

FIG. 1A shows a schematic illustration of a deformation of a triangular autoreactive framework structure 120 under the action of a force F. In the first embodiment, autoreactive framework structure 120, seen in section, is made triangular. Framework structure 120 has a first flexurally elastic flank 121 and a second flexurally elastic flank 122. Cross struts 123 are arranged elastically movable via an elastic connector 124 between flexurally elastic flanks 121, 122. Flexurally elastic flanks 121, 122 and cross struts 123 may be made as planar, plate-like structures. In the triangular embodiment, framework structure 120 at one end forms a tip 128 and at the other end a bar 129 forming a base, formed by a cross strut 123, which is arranged between the ends, diverging on one side, of flexurally elastic flanks 121, 122.

Figures 1B, 1C:
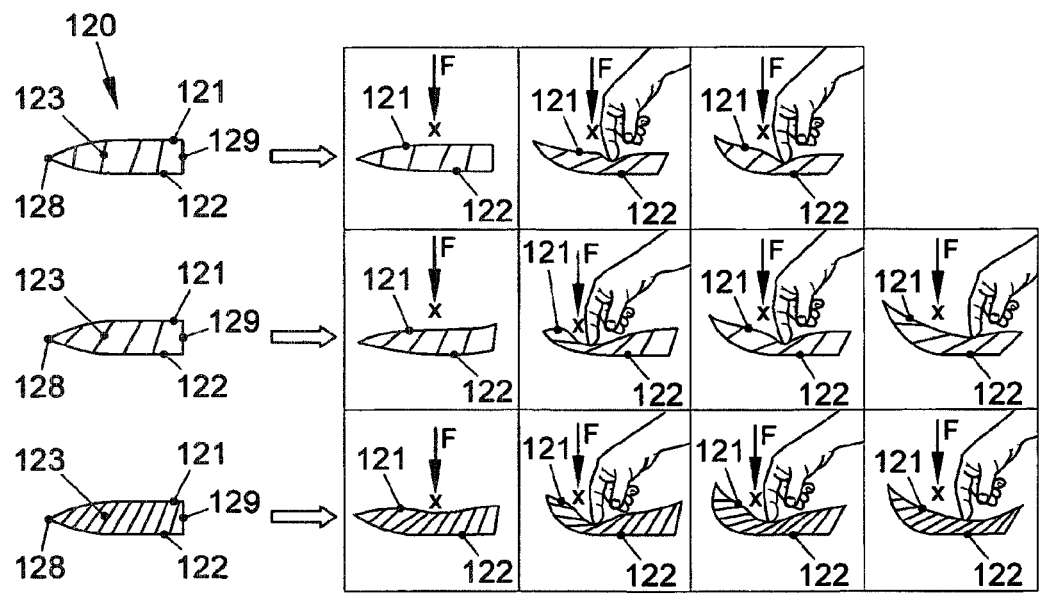
FIG. 1B is a schematic illustration of different variants of triangular autoreactive framework structures.
FIG. 1C is an illustration of the deformation behavior of the autoreactive framework structures shown schematically in FIG. 1B.

FIG. 1B shows schematic sectional illustrations of different variants of the first embodiment, whereby the variants differ in the arrangement of cross struts 123 between flexurally elastic flanks 121, 122. Depending on the number and orientation of cross struts 123 between flexurally elastic flanks 121, 122, under the action of a force F, which acts in a point-like or planar manner on the first flexurally elastic flank 121 and exerts a force pulse on framework structure 120, a deformation, different in each case, of framework structure 120 is produced. The direction of the deformation is opposite to the direction of the force pulse.

The deformation of triangular autoreactive framework structure 120 can be seen in FIGS. 1A and 1C. In FIG. 1A, deformed framework structure 120 is shown in section after force F has acted in the x-direction on the first flexurally elastic flank 121. The starting position and the design of framework structure 120, shown in FIG. 1A, corresponds to the top figure according to FIG. 1B. The deformation shown in FIG. 1A results when framework structure 120 is fixed immovably in the area of bar 129.

The behavior is different, as FIG. 1C shows, when not bar 129 but the second flexurally elastic flank 122 is fixed immovably at least partially. The then occurring deformation behavior is shown in the illustrations of FIG. 1C, whereby each of the horizontal sequences of the illustrations of FIG. 1C is based on the configuration, shown on the left in FIG. 1B, of framework structure 120. It can be seen that the deformation behavior of framework structures 120 changes. Depending on where the force F acts on framework structure 120, a specific deformation behavior of the particular framework structure 120 is produced.

FIG. 2A shows a schematic illustration of a deformation of a rectangular, particularly square framework structure 120 under the action of a force F. In the second embodiment, autoreactive framework structure 120, seen in section, is made rectangular. Framework structure 120 again has a first flexurally elastic flank 121 and a second flexurally elastic flank 122, between which cross struts 123 are arranged elastically movable by means of elastic connector 124. Flexurally elastic flanks 121, 122 in the second embodiment as well can be made as planar, plate-like structures. In the rectangular embodiment, framework structure 120 at both ends forms a base-forming bar 129, which is formed in each case by a cross strut 123. The particular cross strut 123 is arranged between the ends, diverging on both sides, of flexurally elastic flanks 121, 122.

FIG. 2B shows schematic sectional illustrations of different variants of the first embodiment, whereby the variants differ in the orientation of cross struts 123 between flexurally elastic flanks 121, 122. Depending on the number and orientation of cross struts 123 between flexurally elastic flanks 121, 122, under the action of a force F, which acts in a point-like or planar manner on the first flexurally elastic flank 121 and exerts a force pulse on framework structure 120, a deformation, different in each case, of framework structure 120 is produced. The direction of the deformation is opposite to the direction of the force pulse.

The deformation of rectangular autoreactive framework structure 120 can be seen in FIGS. 2A and 2C. In FIG. 2A, deformed framework structure 121 is shown in section after the force F has acted in the x-direction on the first flexurally elastic flank 121. The starting position and the design of framework structure 120, shown in FIG. 2A, correspond to the top figure according to FIG. 2B. The deformation, shown in FIG. 2A, results when framework structure 120 is fixed immovably in the area of bottom bar 129.

The behavior is different, as FIG. 2C shows, when not bar 129 but the second flexurally elastic flank 122 is fixed immovably at least partially. The then occurring deformation behavior is shown in the illustrations of FIG. 2C, whereby each of the horizontal sequences of the illustrations is based on the configuration of framework structure 120, as shown on the left in FIG. 2B. It can be seen that the deformation behavior of framework structures 120 changes. Depending on where the force F acts on framework structure 120, a specific deformation behavior of the particular framework structure 120 is produced.

FIG. 3A shows a schematic illustration of a deformation of a multi-framework structure, comprising two triangular autoreactive framework structures 120, under the action of a force F from the x-direction. The multi-framework structure, made of two triangular framework structures 120, is also called a double framework structure or "double fin ray." The double framework structure, seen in section, shows two triangular structures. The double framework structure to form first triangular framework structure 120 has a first flexurally elastic flank 121 and a second flexurally elastic flank 122, which at the same time is the first flexurally elastic flank 121 for the next triangular framework structure 120. This first flexurally elastic flank 121 is opposite to a second flexurally elastic flank 122 of the second triangular framework structure 120. Each of the two triangular framework structures 120 has cross struts 123, which again may be made as planar, plate-like structures. In this embodiment, the double framework structure at both ends forms a base, which is characterized both by a bar 129 and by a tip 128, which is formed by both framework structures 120.

The deformation of an autoreactive double framework structure can be seen in FIG. 3A. In FIG. 3A, the deformed double framework structure is shown in section after the force F has acted in the x-direction on the first flexurally elastic flank 121. The deformation shown in FIG. 3A results when framework structure 120 is fixed immovably in the area of the bottom base comprising tip 128 and bar 129.

FIG. 3B shows other special schematic sectional illustrations of further embodiments, whereby the three top embodiments differ in the orientation of cross struts 123 between flexurally elastic flanks 121, 122. These three top embodiments are not double framework structures. A deformation, different in each case, of framework structure 120 is produced depending on the number and orientation of cross struts 123 between flexurally elastic flanks 121, 122, under the action of a force F, which acts in a point-like or planar manner on the first flexurally elastic flank 121 and exerts a force pulse on framework structure 120. The direction of the deformation is opposite to the direction of the force pulse.

The particular feature of the embodiment of framework structure 120, which is shown at the very top in FIG. 3B, is that cross struts 123 are arranged obliquely between flexurally elastic flanks 121, 122. A small part of framework structure 120 is even formed without cross struts 123.

The particular feature of the embodiment below it of framework structure 120 is that cross struts 123 form a <V> in the central area of framework structure 120.

The special feature of the embodiment, again below it, of framework structure 120, which is shown as the third from the top in FIG. 3B, is that cross struts 123 form an upside down <V> in the central area of framework structure 120.

FIG. 3B shows further schematic sectional illustrations of other embodiments, whereby the two bottom embodiments of FIG. 3B differ from the three top embodiments to the effect that these are multi-framework structures. These are combined together with the use of the same triangular shape. According to the invention, there is the possibility of combining framework structures with different shapes.

The embodiment, which is shown as the second from the bottom in FIG. 3B, is a double framework structure, as was already shown in FIG. 3A and described in relation to FIG. 3A. The difference from the embodiment according to FIG. 3A is that the arrangement of cross struts 123 has been totally omitted in one of the two triangular framework structures 120.

Finally, the embodiment shown at the very bottom in FIG. 3B is a triple framework structure. The triple structure, viewed in section, shows three triangular framework structures. To form the first triangular framework structure 120, the triple framework structure has a first flexurally elastic flank 121 and a second flexurally elastic flank 122, which faces a second flexurally elastic flank 122 of the second triangular framework structure 120, which in turn at the same time forms the first flexurally elastic flank 121 of the third framework structure 120, which is closed via a second flexurally elastic flank 122. Each of the three triangular framework structures 120 has cross struts 123, which may be made as planar, plate-like structures. At one end, the base of the triple framework structure is formed by two bars 129 and a tip 128, whereby the opposite end also forms a base comprising two tips 128 and one bar 129. It becomes clear that in this way multi-framework structures can be formed in any desired number of individual framework structures of different embodiments. Different forms of a plurality of framework structures can be combined to form a multi-framework structure.

The particular deformation behavior of framework structures 120, shown from top to bottom in the sectional illustrations of FIG. 3B, is shown in the illustrations of FIG. 3C, whereby each of the horizontal sequences of the illustrations forms the basis of the configurations, shown on the left in each case in FIG. 3B and previously described, of framework structure 120. The deformation of the particular framework structure 120, as shown in the illustrations of FIG. 3C, results when framework structure 120 is fixed immovably at least partially with its second flexurally elastic flank 122. It can also be seen here that the deformation behavior of framework structures 120 changes. Depending on where the force F acts on framework structure 120, a specific deformation behavior of the particular framework structure 120 is produced.

Different design forms of basic structures 120 of a head restraint 100 will be described below, which are formed with the previously described embodiments of autoreactive framework structures 120. These design forms are only exemplary. It is understood that the previously described and also other manifoldly formed embodiments and design variants and combinations thereof can be used to form the embodiments of basic structures 120 of a head restraint 100.

The Design Forms Described Below can have the Following in Common:

When head K exerts a force pulse on the first flexurally elastic flank 121 by a force F in the −x-direction, a compensating autoreactive deformation of framework structure 120 is produced at another point in the opposite direction in the +x-direction. The force pulse can be transmitted in a point-like manner at a point of impact P or moreover over the further course of the head movement via an area of impact A to head restraint 100. The side areas of framework structure 120 give way with the formation of a type of side wings 101 substantially in the +x-direction, as is made clear with the direction arrows shown in FIGS. 4A to 4D. Therefore, a head restraint 100 can be brought from starting position I to a slumber or crash position II by the force pulse (see FIGS. 5A to 5C and FIGS. 6A to 6C), as a result of which a slumber head restraint and/or a crash-active head restraint can be formed.

Figure 4A:
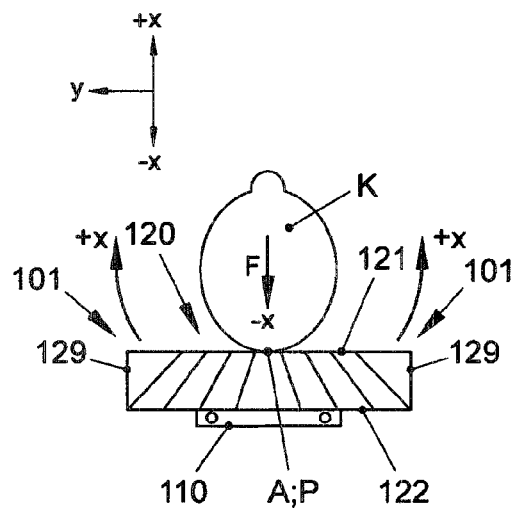
FIGS. 4A, 4B, 4C, and 4D are exemplary schematic illustrations of a number of embodiments of a basic structure of a head restraint.

FIG. 4A shows a first design form. Head restraint 100 has a support structure 110 as the basic structure. A framework structure 120 is attached to support structure 110, as is shown in FIG. 3B in the third illustration from the top. Framework structure 120 has the upside down <V> in the center. Viewed in the x-direction, framework structure 120 is formed axially symmetric. In the associated illustration sequence in FIG. 3C, the deformation behavior of this framework structure 120 becomes clear. The second flexurally elastic flank 122 is at least partially connected to support structure 110, so that framework structure 120 is fixed immovably to support structure 110. The first design form is described in still greater detail below by means of FIGS. 5A to 5C.

Figure 4B:
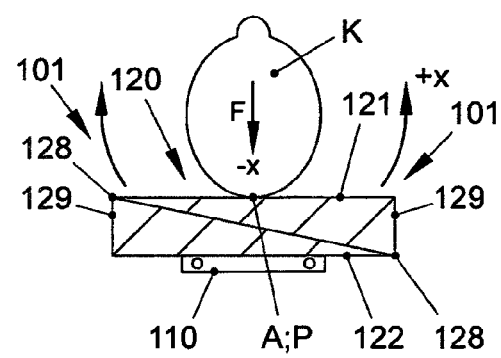

FIG. 4B shows a second design form. Head restraint 100 again has a support structure 110 as the basic structure. A double framework structure 120 is attached to support structure 110, as has been described and is shown in FIG. 3A. In contrast to FIG. 3A, the second flexurally elastic flank 122 is fixed immovably to support structure 110.

Figure 4C:
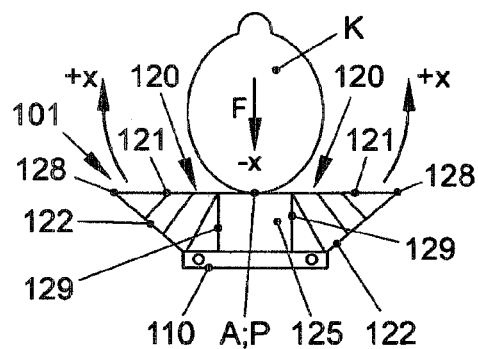

FIG. 4C shows a third design form. Head restraint 100 has a support structure 110 as the basic structure. In the center of head restraint 100 viewed in the x-direction, a cushion, particularly a foam part 125, is arranged axially symmetric. Foam part 125 in each case abuts the base of a framework structure 120 (on the left and right viewed in the y-direction), which in each case is formed by bar 129. Preferably, both framework structures 120 are connected immovably via their second flexurally elastic flank 122 at least partially to support structure 110. In this third design form, triangular framework structures are used as framework structures 120, as they are illustrated in the top illustration according to FIG. 1B. The particular feature of this third design form is that the force pulse is transmitted via foam part 125 to triangular framework structures 120. The advantage is that head K of the person does not come into contact directly with framework structures 120. In the case of a small force F and thus a small force pulse, the transmission occurs via the back of head K point-like or during the further course of the head movement via a small area of impact A, so that the force transmission always occurs via foam part 125 indirectly to framework structures 120. This force transmission occurs when the person by the back of his head adjusts head restraint 100 as a slumber head restraint. In the case of a strong force F and thereby a large force pulse, the transmission occurs via the back of head K over a large area of impact A, so that the transmission occurs indirectly via foam part 125 and directly via framework structures 120, as a result of which the adjustment process occurs faster. This type of force transmission occurs when in the event of a crash the back of the person's head suddenly strikes head restraint 100. This function enables the development of a crash-active head restraint 100, in which the secure holding of head K of the person in head restraint 100 is to be realized within a short time.

Figure 4D:
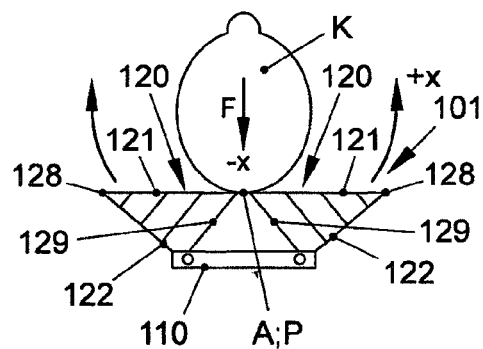

FIG. 4D shows a fourth design form. Head restraint 100 again has support structure 110 as the basic structure. A framework structure 120 is attached to support structure 110, as has already been illustrated in FIG. 4C and has been shown and described in the top illustration according to FIG. 1B. In contrast to FIG. 4C, no foam part 125 is arranged but the two triangular framework structures 120 are connected together via the first flexurally elastic flank 121. In the middle of head restraint 100 viewed in the x-direction, a free space is created axially symmetric, which is formed between the particular base of framework structures 120 by the particular bar 129 of framework structures 120 and support structure 110. An especially flexible double framework structure is formed by this measure, because no cross struts 123 are arranged in the central area of the framework structure. The reaction to a force pulse occurs immediately, as in FIGS. 4A and 4B, as soon as the back of the head strikes the first flexurally elastic flank 121 of framework structure 120 point-like or in the further course of the head movement in a planar manner.

Figure 5A:
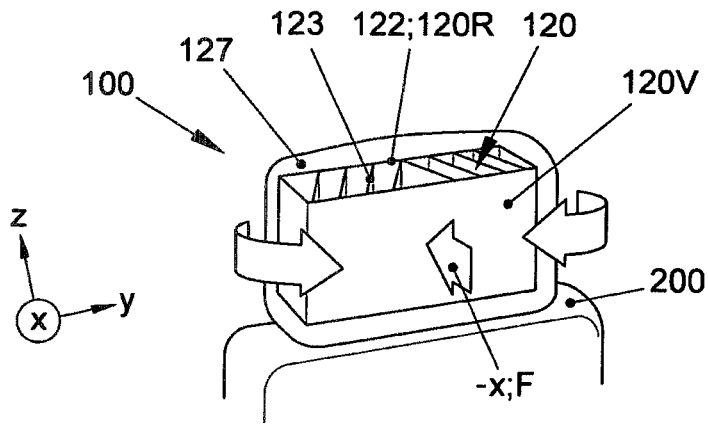
FIGS. 5A, 5B, and 5C illustrate a slumber head restraint, activatable independently by a force pulse by the head of a vehicle seat user, with a basic structure having an autoreactive framework structure.

Slumber Head Restraint:

FIG. 5A shows a head restraint 100 on a backrest 200. For example, a framework structure 120 is used, as is already shown in FIG. 4A and described in relation to FIG. 4A. A front side 120V of framework structure 120 is formed by the plate-like design of the first flexurally elastic flank 121. A rear side 120R of framework structure 120 is formed by the plate-like design of the second flexurally elastic flank 122. Cross struts 123 are arranged elastically movable, also as plate-like elements, between plate-like flexurally elastic flanks 121, 122. Cross struts 123 run in the z-direction and flexurally elastic flanks 121, 122 run in the y-direction. Framework structure 120 is attached to a support structure 110, which is not shown. A cover or internally lined cover 127 can be arranged selectively around framework structure 120. There is also the possibility of providing framework structure 120 as an insert within a foam of a head restraint 120. In such a case, the foam is then provided with a cover 127. In FIG. 5A with the aid of the arrows, the reaction of framework structure 120 is clarified, when a force F strikes framework structure 120 axially symmetrically from the −x-direction.

Figure 5B:
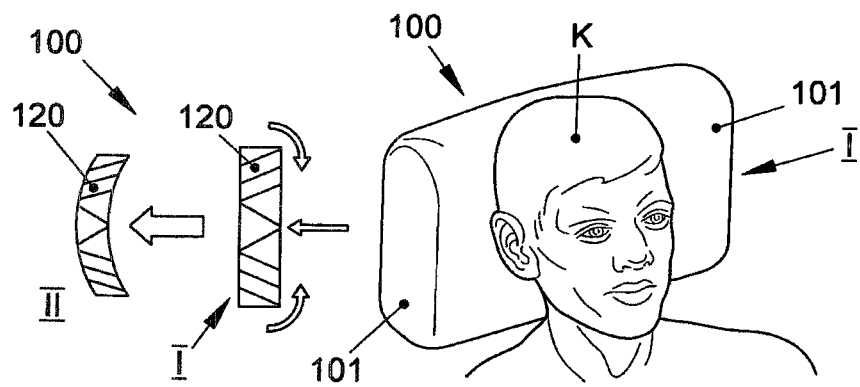

In FIG. 5B, head K of a person is shown, whereby head restraint 100, provided with a cover 127, is in the starting position I. During striking of a force F, the deformation occurs according to the schematic sectional drawings shown on the left in FIG. 5B, to a slumber position II.

Figure 5C:
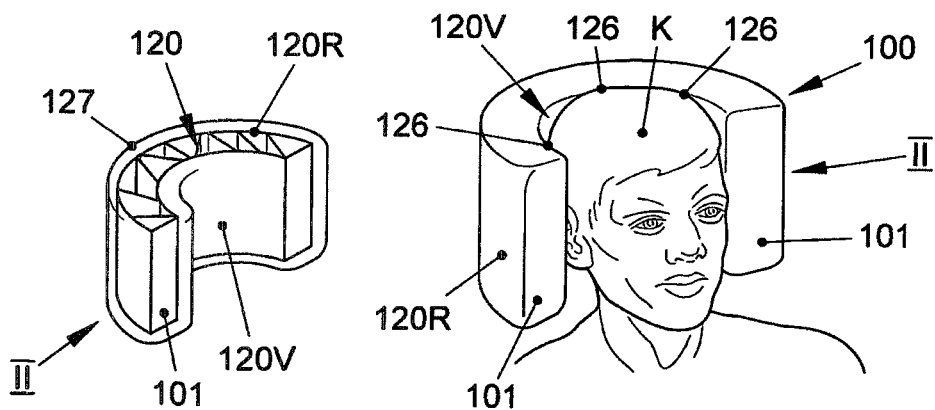

FIG. 5C shows the result. Head K of the person is surrounded by the front side 120V of framework structure 120. Head restraint 100 forms the back and side contact surfaces 126 against which head K comes to rest, so that head K is securely received by head restraint 100 and held in a slumber position. The left illustration of FIG. 5C shows once again the deformed framework structure 120 in slumber position II within a cover 127 but without support structure 110.

Crash-Active Head Restraint:

The top and bottom illustrations of FIGS. 6A to 6C show as a set a position of the upper body and with the aid of measuring point 130 the position of head K of a person, sitting upright on a vehicle seat, whereby before a crash the person is still in an upright normal position in the illustrations according to FIG. 6A.

According to FIG. 6B, in a crash the person is moved in the −x-direction. The back of head K strikes point-like via point of impact P the front side of head restraint 100 and thereby front side 120V of framework structure 120, which is not shown in greater detail in the figures. In a crash, the transmission of the force F has the result that in the further course of the head movement a large area of impact A forms within a short time between the back of head K and front side 120V of framework structure 120; as a result, the reaction of the deformation of framework structure 120 occurs faster in the opposite +x-direction.

FIG. 6C shows the mode of action, whereby it becomes clear from the illustrations that head K is received by side wings 101, forming to the sides, viewed in the y-direction, of head restraint 100. Side wings 101 in crash position II are substantially oriented in the x-direction. FIG. 6C makes it clear by means of the bottom one of the two illustrations that side wings 101 react differently when head K does not strike head restraint 100 axially symmetric in the −x-direction. If head K comes to lie more to the side in the y-direction, side wing 101 will deform on this side accordingly more greatly in the +x-direction, so that side contact surface 126 forms more rapidly, on the one hand, and is pivoted more greatly in the +x-direction, on the other, than side wing 101 forming on the opposite side.

This function of the formation of a contact surface 126, formed more greatly on one side, in the event of a force pulse acting asymmetrically relative to the x-direction on front side 120V of head restraint 120 also applies to the slumber head restraint previously described in FIGS. 5A to 5C. An asymmetrically oriented, lateral stressing by the back of the head of the slumber head restraint has the result that side wings 101 of head restraint 100 on the stressed side are pivoted more greatly in the +x-direction than to the opposite side.

The described possible head restraints 100 in an advantageous manner therefore have safety and comfort functions in the design as crash-active head restraints or slumber head restraints.

A lower technical effort is needed for the described head restraints 100, because no actuators such as, for example, mechanical or pneumatic or electrical controls, are necessary. In comparison with other actuator systems for head restraint adjustment, an automatic reaction without additional actuators occurs in these autoreactive head restraints. The autoreactive head restraints are simple in structure, inexpensive, and particularly very light, so that in a further advantageous manner the result is a weight reduction of head restraint 100.

Due to the safety function a gain in safety is possible with a low technical effort, whereby in an advantageous manner an automatic and load-dependent autoreactive adjustment of the head restraint contour occurs, which proceeds from the person and is transmitted via head K to head restraint K 100 and which can be used advantageously to avoid the whiplash effect of a person's head K.

Finally, it is pointed out that a head restraint 100 with an autoreactive framework structure 120 can be arranged not only as a single head restraint via support rods 400 on a backrest 200, but that head restraint 100 can also be integrated into the structure of a backrest 200. In this respect, then a backrest 200 with a head restraint 100 with an autoreactive framework structure 120 results, whereby backrest 200 itself can be formed with an autoreactive framework structure.

Other innovative details on the development of head restraints 100 with an autoreactive framework structure are described in the following figures. These details supplement the previously described basic principle.

Figure 7A:
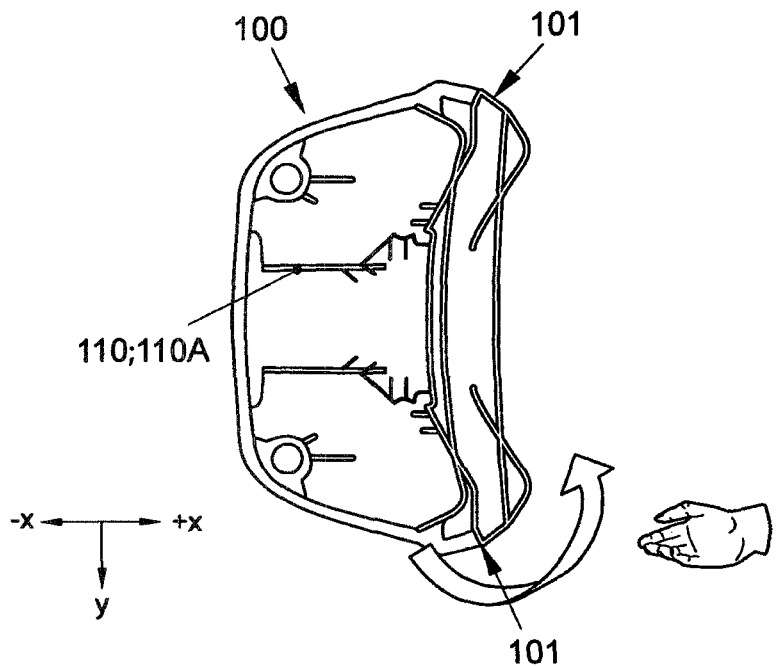
FIG. 7A illustrates a section through the basic structure through a head restraint according to the conventional art.

Autoreactive Actuation of the Head Restraint:

FIG. 7A shows in a section in the x/y plane a conventional head restraint 100 with side wings 101, which are attached movably to a support element 110A of a support structure 110. The possibility, provided as a comfort function, of adjusting side wings 101, in which side wings 101 starting from a starting position to a comfort position are brought closer to the occupant's head K, occurs in a manner known per se manually or by means of drives, which are generally accommodated in the available installation space of head restraint 100.

Figure 7B:
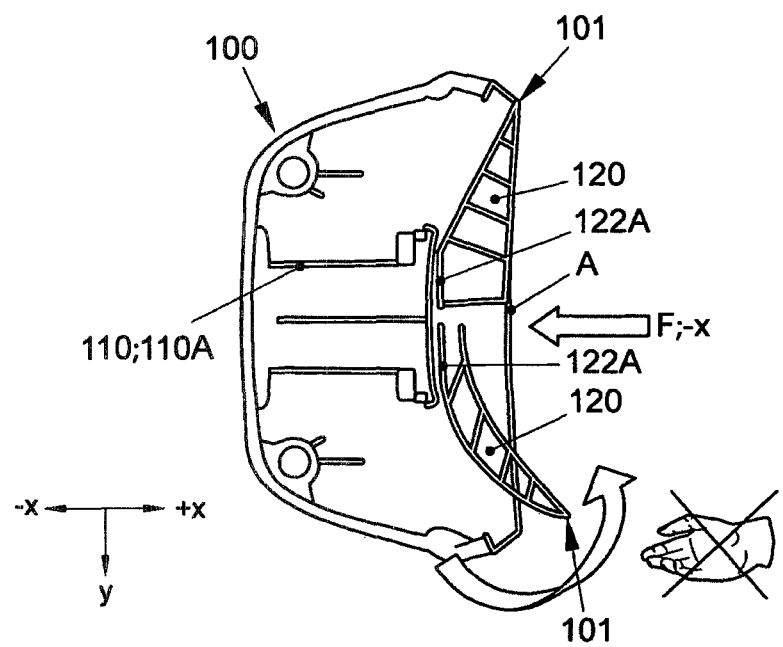
FIG. 7B illustrates a section through a head restraint with an autoreactive framework structure.

Through the use of autoreactive framework structures 120, which are employed as side wings 101 of head restraint 100 in FIG. 7B and utilize the fin ray principle, the necessity of having to operate side wings 101 manually or by means of drives no longer applies in an advantageous manner. This advantage is clarified in a further section, also lying within the x/y plane, from FIG. 7B.

In FIG. 7B, an autoreactive framework structure 120 as side wings 101 is shown in the top area of head restraint 100; at its bottom area 122A, the structure is also arranged on a support element 110A of the support structure, whereby side wings 101 are in the starting position and therefore have not yet adopted the comfort position. In the bottom area of head restraint 100 of FIG. 7B, framework structure 120 is shown as side wings 101 by way of comparison in the comfort positions.

Side wing 101 according to the shown arrow is moved closer to the side area of a head K not shown in greater detail. This comfort position is brought about with utilization of the fin ray principle, when during movement of head K in the −x-direction a rear side of head K strikes the area of impact A with the force F.

An autoreactive actuation of side wings 101 of head restraint 100 results. In other words, a head-weight-activated autonomous raising of side wings 101 occurs in terms of a movement of side wings 101 from the starting position opposite to the direction of force, acting in the −x-direction, into the comfort positions in the +x-direction.

If the force F has not yet acted or no longer acts on autoreactive framework structure 120, side wings 101 are unstressed and are still in the starting position or again adopt the starting position independently when they are again unstressed.

In an advantageous manner, an automatic adjustment of side wings 101 to the comfort positions and an automatic return to the starting position result. Depending on how great the force F is that acts on side wings 101, an optimized, independent contour adjustment of side wings 101 to the back of the head or the side areas of the occupant's head K occurs.

A comparison between FIG. 7A and FIG. 7B makes it clear that the use of cables, wires, drives such as engines and pumps and friction hinges and control devices can be omitted. In FIG. 7B, such structural elements are no longer present and advantageously are no longer needed to adjust side wings 101 of head restraint 100.

Figure 8A:
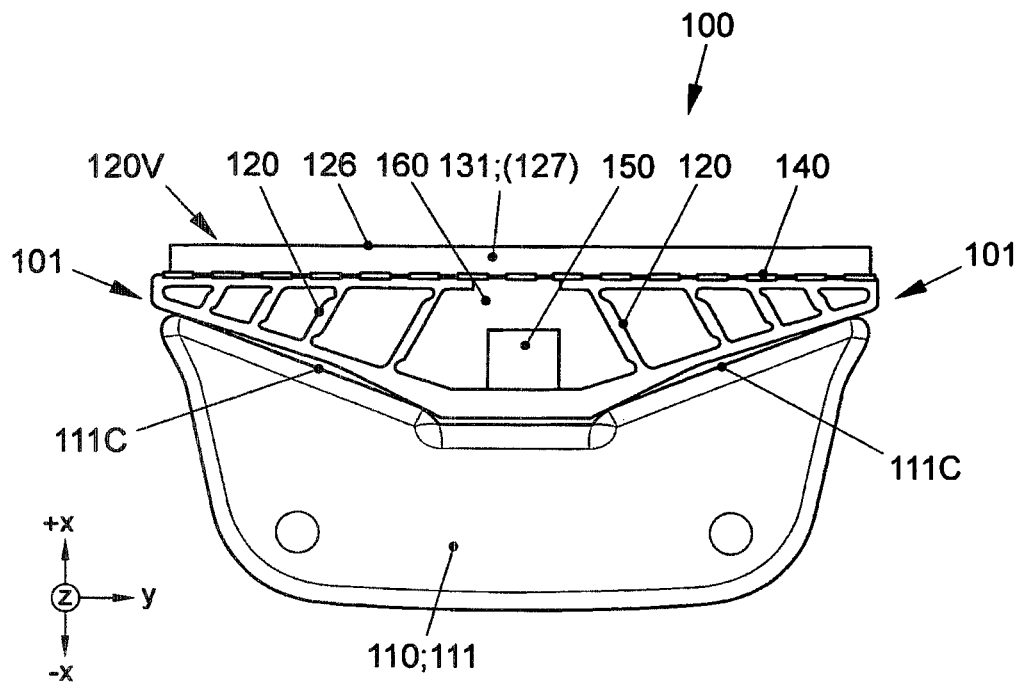
FIGS. 8A, 8B are sectional views of a head restraint with an autoreactive framework structure for clarifying a head box and a sliding plane between the autoreactive framework structure and a cushion element.
Figure 8B:
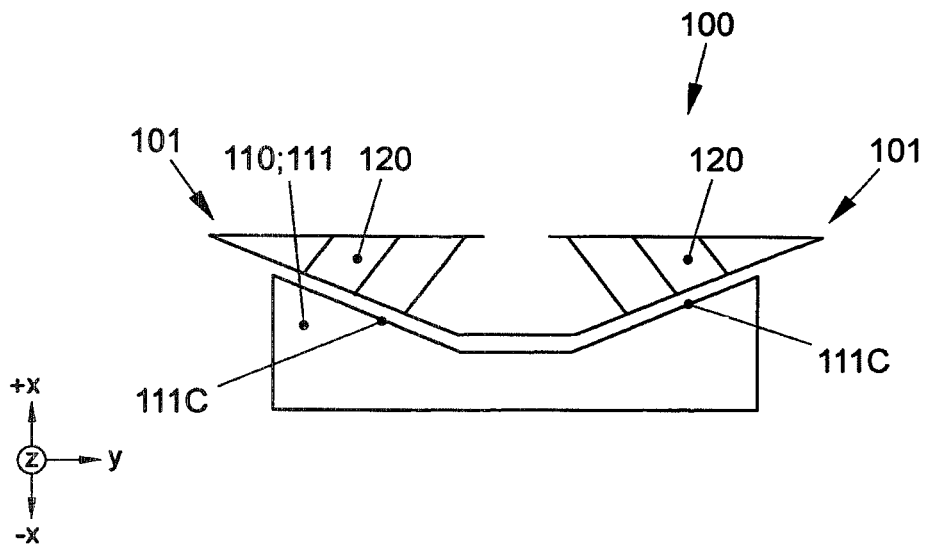

Design of a Sliding Plane and Formation of a Head Box:

FIGS. 8A and 8B show in further sections in the x/y plane head restraint 100 with support structure 110. Whereas support structure 110 in FIG. 8A is provided with a cover 127, support structure 110 in FIG. 8B is shown only schematically. Cover 127 in a preferred embodiment is lined on its inner side with foam. In this type of embodiment, support structure 110 is a so-called head box 111, which is formed like a box and which at least on its outer side is padded at least partially with the foam and is provided with cover 127; this will be addressed further below in greater detail. Details on the embodiment of the head box will be discussed in connection with FIGS. 15A to 15E and 16A to 16D.

Autoreactive framework structure 120, which forms side wings 101, is attached to head box 111. A cover 127 is also arranged on the front side 120V of head restraint 100. It is proposed that said cover 127 on its side facing autoreactive framework structure 120 also has a foam lining, so that a contact area 126 of head K forms on the head-side cushion element 131, which is arranged above autoreactive framework structure 120 formed as side wings. Said cushion element 131 can be formed independent of the padding of the previously described head box 111.

To keep the friction as low as possible between cushion element 131, which, different from what is shown, is placed around side wings 101 to head box 111, it is proposed to make provisions between cushion element 131 below autoreactive framework structure 120 in a sliding plane 140 extending in the z-direction to keep the friction coefficient between the inner side of cushion element 131 and the front side of autoreactive framework structure 120 as small as possible.

In a first embodiment variant, it is proposed that an additional structural element in the nature of a friction-reducing film, particularly a PE film, be arranged between cushion element 131 below autoreactive framework structure 120.

In a second embodiment variant, a friction-reducing coating is proposed.

In a third embodiment variant, it is proposed to provide at least one of the surfaces that face one another of autoreactive framework structure 120 or of cushion element 131 with a wetting agent, whereby a release wax is proposed in particular.

It is essential in order to impede as little as possible the function, i.e., the relative movement of cushion element 131 towards autoreactive framework structure 120, that the facing adjacent surfaces of cushion element 131 and framework structure 120 form a friction pair.

FIGS. 8A and 8B each show further an opening 160 in autoreactive framework structure 120 in the manner of a gap running in the z-direction between side wings 101. The gap is arranged axially symmetric when viewed in the x-direction.

Opening 160, the gap, forms the access to an absorbing element 150, which will be discussed further in greater detail.

In the exemplary embodiment illustrated in FIGS. 8A and 8B, autoreactive framework structure 120 according to the illustrated section is formed trough-shaped in the x/y plane.

Absorbing element 150 is arranged on the bottom of the trough, whereas the rising side areas of the trough form the back of side wings 101. Autoreactive framework structure 120 therefore on its side facing head box 111 has a formation 111C, which is formed as a trough-shaped contour.

It turned out that the effectiveness of the autoreactive function of framework structure 120 during adjustment of side wings 101 from the starting position to the comfort position and back is supported when box section 111 has an analogous formation 111C on its side facing framework structure 120. According to the exemplary embodiment, head box 111 therefore also has a trough-like contour.

Figure 9A:
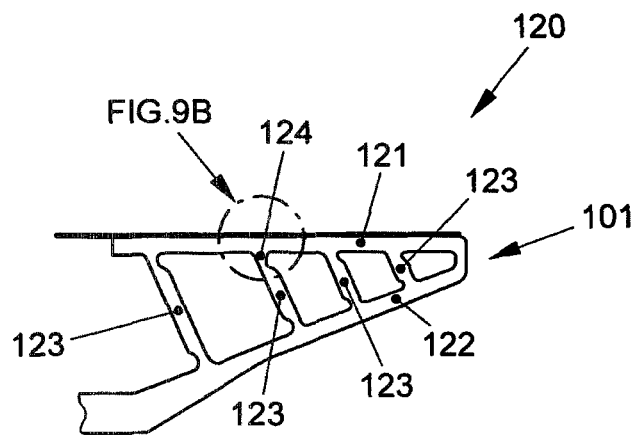
FIGS. 9A, 9B illustrate autoreactive framework structures as side wings of the head restraint for clarifying a hinge-like structure of the side wings.
Figure 9B:
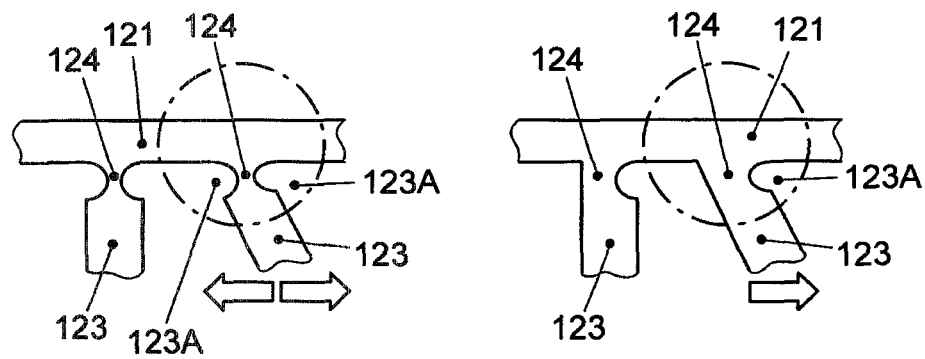

Hinge Structure of the Framework Structure:

FIGS. 9A and 9B clarify in an overview a preferred hinge-like structure of autoreactive framework structure 120. As has been described in the description of the basic principle, elastic connector 124, in the manner of elastic cross struts 123, are arranged movably between flexurally elastic flanks 121, 122.

FIG. 9A shows a side wing 101 of head restraint 100, whereby one of the hinge-like connections according to the detail in FIG. 9A is shown enlarged in the right illustration of FIG. 9B.

Flexurally elastic flanks 121, 122 are also called straps and the cross struts 123 are also called cross ribs.

Joints or hinges, made as single or multiple parts, are formed as connector 124 between straps 121, 122 and cross ribs 123.

A one-part design makes possible in an advantageous manner the production of the autoreactive framework structure in one work step from one and the same material.

A two-part construction makes possible in an advantageous manner the production of the autoreactive framework structure 120 from different materials in a number of work steps.

The embodiment of the hinge or joint in a first preferred embodiment can occur in such a way that the hinge site or the joint site, for example, between strap 121 and cross rib 123 occurs through inwardly directed projections 123A on both sides in cross rib 123, by which the elasticity of the hinge site or the joint site can be influenced.

The left illustration in FIG. 9B shows a first preferred embodiment with the inwardly directed projections 123A on both sides, which cause material weakening on both sides, so that according to the two arrows arranged in the opposite direction it becomes clear that movement of cross rib 123 relative to strap 121 is promoted in both directions of movement.

The right illustration in FIG. 9B shows a second preferred embodiment with only one inwardly directed projection 123A on one side according to FIG. 9A. In the case of this one-sided projection 123A, according to the arrow arranged in only one direction, it becomes clear that because of the one-sided material weakening of cross rib 123 at the hinge site or the joint site only one direction of movement is influenced by the material weakening of cross rib 123.

This second preferred embodiment is advantageous insofar as during movement of side wings 101 from the starting position to the comfort position the resistance at the site of material weakening of cross rib 123 at the connection site to strap 121 is minimal.

Cross rib 123 or cross ribs 123 therefore can be easily shifted and without great resistance within strap 121, 122, so that the adjustment from the starting position to the comfort position already occurs at only low force application F.

Another advantage of the one-sided projection 123A further is that the material thickness of cross rib 123 can be fully utilized to provide the material weakening on the side of cross rib 123 on which buckling of cross rib 123 relative to strap 121 occurs if side wing 101 is adjusted from its starting position to its comfort position.

On the other hand, the resetting of side wings 101 from the comfort position to the starting position is supported, because the opposite area in the one-sided projection 123A is not weakened in terms of material, because cross rib 123 is tensioned relative to strap 121 during movement from the starting position to the comfort position. During the resetting, cross rib 123 pushes back to it starting position, as a result of which the resetting of side wing 101 is supported by the pretensioning arising in the particular cross rib 123 during movement from the starting position to the comfort position.

As FIG. 9A makes clear, in the case of a one-sided projection 123A it is proposed to arrange the opposing connecting sites of a cross rib 123 alternately.

At the connecting sites, projection 123A between flexurally elastic flank 121 (strap) and cross strut 123 (cross rib) is made on the right side and at the opposite connecting site, projection 123A between flexurally elastic flank 122 (strap) and cross strut 123 (cross rib) is made on the left. By this alternating arrangement of the projections, the buckling movement of autoreactive framework structure 120 of side wing 101 is promoted from the starting position to the comfort position and back.

Embodiment of a V Shape of the Contact Area of the Head Restraint:

It turned out that a slight V shape of side wings 101 is perceived as pleasant in terms of comfort. This type of V shape is also called "dishing" of the contact area.

Within the V shape, in addition greater "dishing" of side wings 101 in the bottom area of head restraint 100 relative to the top area of head restraint 100 is perceived as pleasant. In other words, in the top area of head restraint 100, according to FIGS. 10A and 10B, side wings 101 lie substantially in a z/y plane, whereas side wings 101 in the bottom area of head restraint 100 emerge dish-like from the z/y plane forward toward an occupant's head K.

To form the desired "dishing" of contact area 126 of head restraint 100, a first approach is proposed which is based on the fact that autoreactive framework structure 120 is formed geometrically in such a way that said "dishing" arises within a one-part structural element. It is proposed to vary the material thickness of framework structure 120 or to vary the design and number of cross ribs 123 and straps 121, 122 optionally having different material thicknesses, so that "dishing" is caused by the different material thicknesses.

Figure 10A:
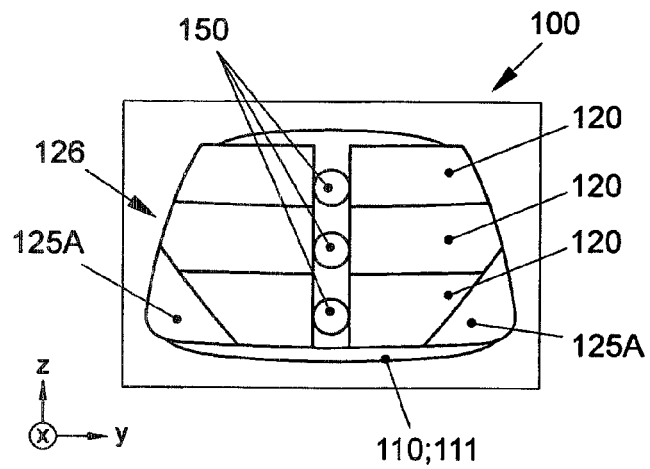
FIG. 10A is a section through a head restraint in the area of the framework structure(s), formed as side wings, for clarifying a first and second approach for embodying a V position of the contact area of the head restraint.

This first approach basically also includes the solution illustrated in FIG. 10A. Pads, particularly foam pads, which can be a hard foam, are arranged in the bottom area of framework structure 120.

These pads can be formed as a corner foam part 125A and attached, particularly glued, to autoreactive framework structure 120. By arrangement in the bottom corners of the contact area of head restraint 100, viewed to the left and right in the y-direction, the bottom corner areas are raised compared with contact area 126 lying in starting position I substantially in the z/y plane. The corner foam parts 125A can be arranged on one-part framework structures 120 or a multiple-part framework structure 120, as will be explained below.

In a second more costly approach, it is proposed, according to FIG. 10A, to arrange among one another a plurality of autoreactive framework structures 120 with different geometric shapes, viewed in the z-direction and adapted to the imaginary line of the outer contour of head restraint 100. Thus, a first framework structure 120 can be arranged in the top area of head restraint 100, which lies in the z/y plane, whereas the second framework structure 120 underneath is slightly "pre-dished" in the middle area of head restraint 100 and a third framework structure 120 in the bottom area of head restraint 100 is "pre-dished" most greatly geometrically in the +x-direction. It is understood that more than three or also less than three framework structures 120 can be used to form the dished V shape of contact area 126 of head restraint 100.

The second approach can be combined with the first approach, as is shown in FIG. 10A. A framework structure 120 formed from a plurality of autoreactive framework structures is provided on both sides with corner foam parts 125A in the area of the bottom framework structure, so that contact area 126 of head restraint 100 is already "pre-dished" in starting position I in the +x-direction. Moreover, third framework structure 120 in the bottom area of head restraint 100 in starting position I of the framework structure in addition could be "pre-dished" most greatly geometrically in the +x-direction, so that the approach can be used in combination.

Figure 10B:
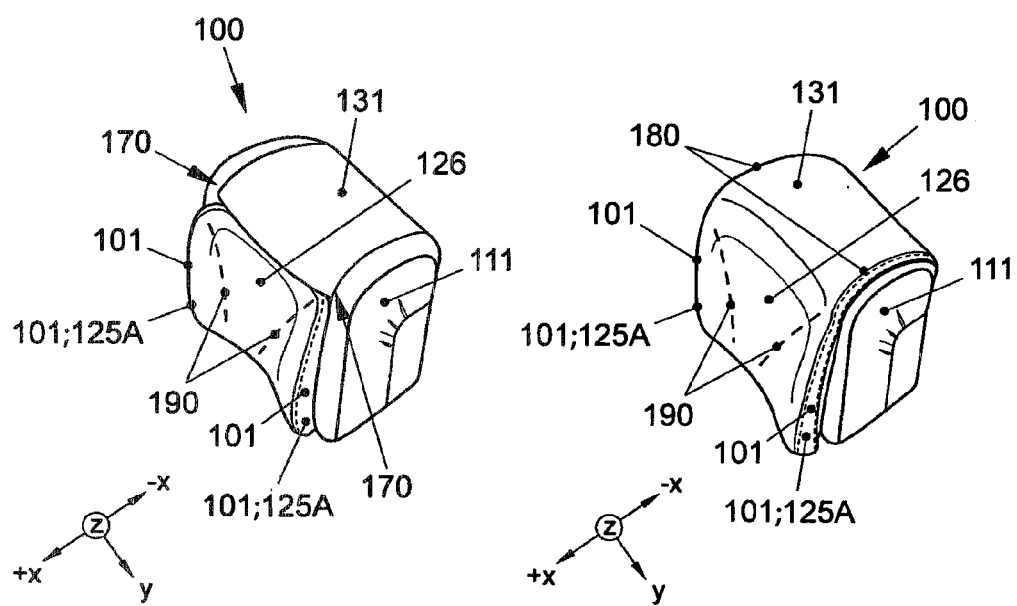
FIG. 10B is a perspective illustration of head restraints with autoreactive framework structure(s) formed as side wings for clarifying a third approach in two variants for embodying a V position of the contact area of the head restraint.

A third approach is proposed, which is shown in FIG. 10B in a left and a right illustration. The "dishing" here is not produced by the geometric properties of autoreactive framework structures 120 or by arrangement of corner foam parts 125A, but the upper outer corners of cushion element 131 in a first variant approximately in the area of the upper end of contact area 126 of head restraint 100 are given a fixation 170 (left illustration in FIG. 10B) on head box 111.

In a second variant of the third approach, no fixation 170 is provided, but cushion element 131 is guided around above head box 111. This flanging 180 (right illustration in FIG. 10B) also has the effect that the top outer corners of cushion element 131 are fixed to head box 111.

In a third variant of the third approach, it is proposed to combine fixation 170 and flanging 180 of cushion element 131.

It is understood that the variants of the third approach for creating the "dishing" can also be carried out in combination with the first or second approach, as FIG. 10B makes clear by the reference characters in the left and right illustration.

By fixation 170 (left illustration in FIG. 10B) or flanging 180 (right illustration in FIG. 10B), the one- or multipart autoreactive framework structure 120 is kept in the z/y plane by cushion element 131 in the top area, whereas the middle and bottom area relative to head box 111 is formed in the pre-dished position in starting position I and thereby already forms a dished contour in starting position I.

For pre-dishing, the geometry of autoreactive framework structure 120 is predetermined and/or the use of the corner foam parts 125A in the bottom corner area of autoreactive framework structure 120 of side wings 101 is proposed. Corner foam parts 125A are indicated in FIGS. 10A and 10B with the reference character 125A. They are located behind cushion element 131 on autoreactive framework structure 120.

Figure 11:
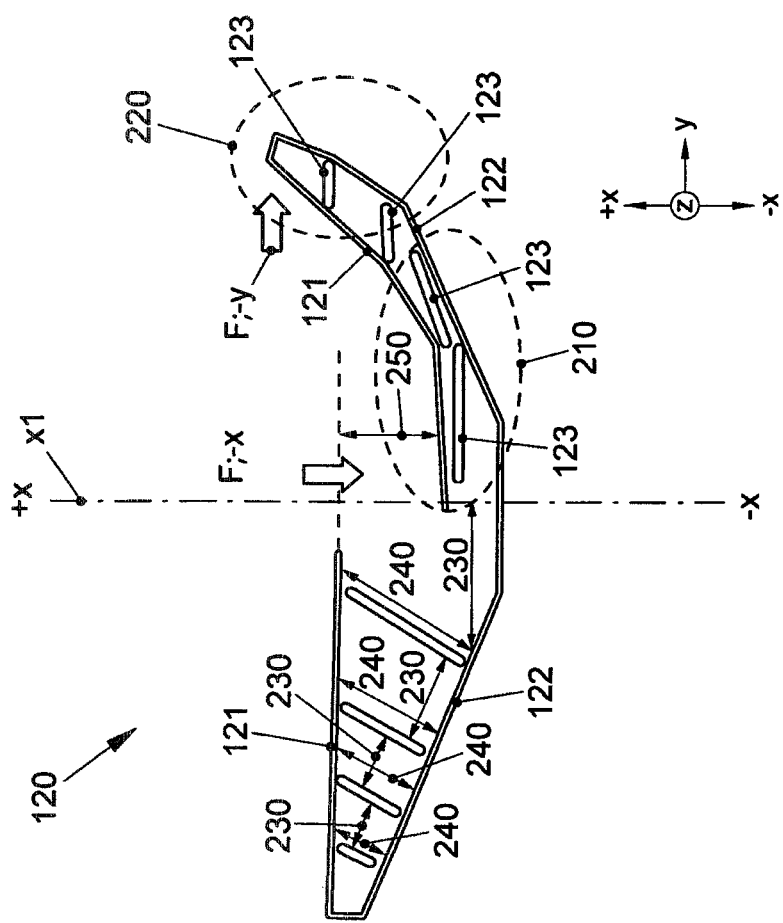
FIG. 11 illustrates a section through a head restraint in the area of autoreactive framework structure(s), formed as side wings, for clarifying the optimal arrangement of the cross struts within the autoreactive framework structure(s)

Coordination of the Length and the Distances of the Cross Struts (Cross Ribs):

It has turned out further that by coordinating the distance 230 between cross ribs 123 and by selecting the length 240 of cross ribs 123 between straps 121, 122 an advantageous effect is produced which is clarified with the use of FIG. 11.

In FIG. 11, an autoreactive framework structure 120 is shown again in a schematic section in the x/y plane, whereby the left part of framework structure 120 is shown in a starting position and the right part of framework structure 120 for comparison and to clarify the effect is shown in a comfort position.

In the starting position (on left), it is shown that length 240 of cross ribs 123 proceeding from an axially symmetric central axis x1 decreases from inside to outside. Moreover, proceeding from the axially symmetric central axis x1, distance 230 between cross ribs 123 becomes increasingly smaller from inside to outside.

As becomes clear in the shown comfort position (on right), cross struts 123 in a middle area 210 during the action of the adjusting force F in the −x-direction are compressed; in other words, cross ribs 123 lie substantially parallel to straps 121, 122.

The advantage is the maximum structure utilization of framework structure 120; in other words, the available space is optimally utilized, because due to the fact that cross ribs 123 in middle area 210 are compressed, a large optimized adjustment path 250 in the −x-direction is achieved.

In addition, pressure spikes are prevented particularly in middle area 210.

Owing to the smaller distance 230 and the smaller length 240 in outer area 220 of autoreactive framework structure 120, side wings 101 are optimally stiffened, so that when a force F acts from the y-direction on side wing 101, side wing 101 provides optimal improved lateral support.

Figure 12:
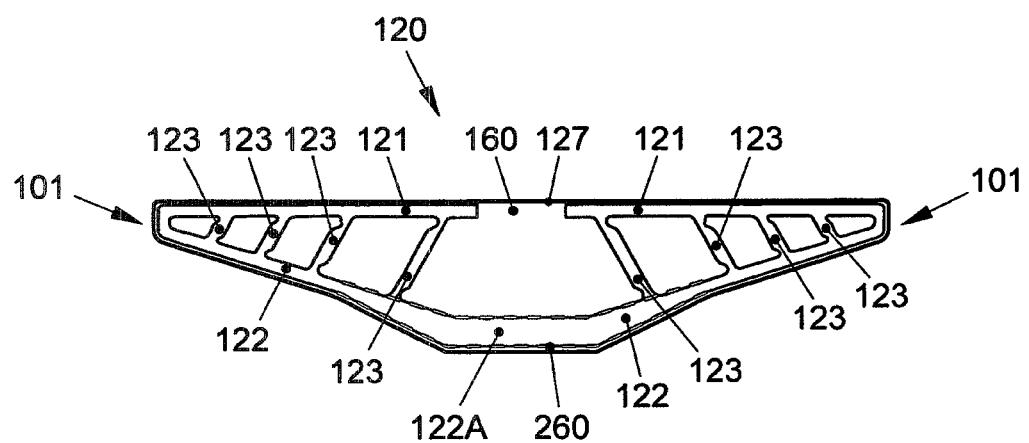
FIG. 12 illustrates a section through a head restraint in the area of autoreactive framework structure(s), formed as side wings, for clarifying a base-side stiffening of the autoreactive framework structure(s)

A further advantageous design feature is made clear in FIG. 12. Flexurally elastic flank 122 formed on back 120R of framework structure 120 has a material-reinforced bottom area 122A. The reinforcement of the material of bottom area 122A helps the stability of the framework structure as a whole.

In order to increase the stability of back 120R still further, the reinforced area is provided in addition with stiffening 260. Stiffening 260 comprises bottom area 122A and in the exemplary embodiment is continued in the direction of the ends of side wings 101 beyond first cross ribs 123.

It is advantageously achieved by stiffening 260 that framework structure 120 is not "pre-dished" unintentionally by a tension of cover 127. A tautly arranged cover 127 otherwise leads to an unintentional adjustment movement of side wings 101 forward in the direction of the occupant's head. Such an unintentional adjustment movement is advantageously counteracted by stiffening 260.

Figures 13A, 13B:
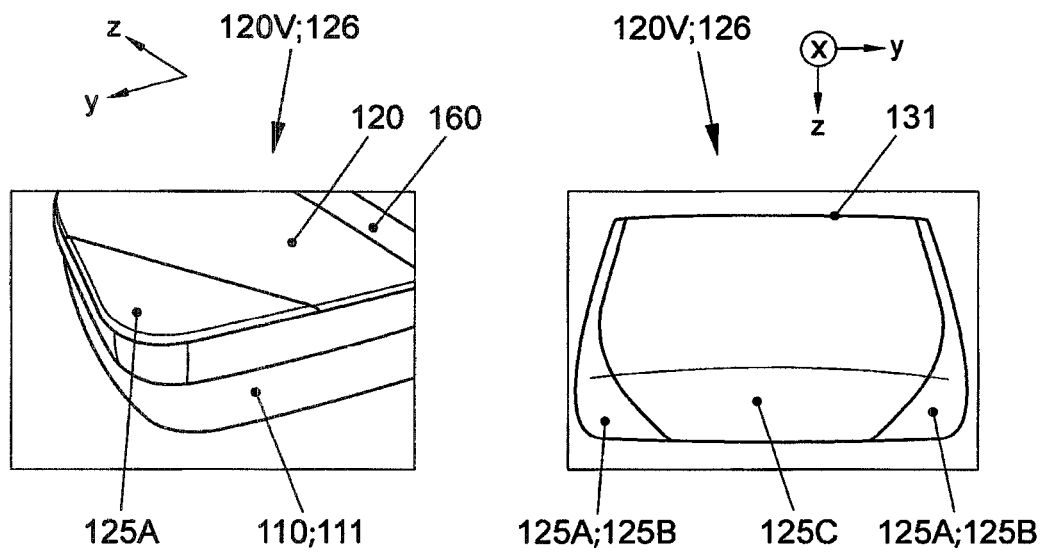
FIGS. 13A and 13B are an illustration of the autoreactive framework structure(s), formed as side wings, for clarifying the structure of the head restraint with foam parts.

FIG. 13A shows an embodiment variant for the formation of head restraint 100. As described, contact area 126 of head K is formed by cushion element 131 which is provided with a cover and sits on autoreactive framework structure 120 preferably separated by sliding plane 140 (see FIG. 8A).

Front side 120V of head restraint 100 of autoreactive framework structure 120 (without cushion element 131) is shown in FIG. 13A in the perspective view laterally and obliquely from above, whereby a corner foam part 125A is arranged and attached, particularly glued to autoreactive framework structure 120, in the left bottom corner area of autoreactive framework structure 120 of head restraint 100.

FIG. 13A supplements the illustration of FIG. 10A, whereby in FIG. 13A autoreactive basic structure 120 is formed and shown as a one-part framework structure 120. Unlike FIG. 13A, FIG. 10A shows a multi-part autoreactive framework structure 120 with preferably glued-on corner foam parts 125A.

The use of corner foam parts 125A in the bottom area side wings 101 helps the comfortable design of head restraint 100 with raised corner areas, as a result of which contact area 126 of head restraint 100 is changed, because the contact area now forms a so-called cushioned collar, similar to a neck pillow.

In FIG. 13A, in analogy to FIG. 10A, sliding plane 140 is formed on autoreactive framework structure 120 and corner foam parts 125A. The one-part cushion element 131 is therefore placed on the one-part framework structure (FIG. 13A) or the multi-part autoreactive framework structure 120 (FIG. 10A) and corner foam parts 125A, whereby cushion element 131 by means of corner foam parts 125A forms the desired cushioned collar. Cushion element 131 is movable relative to autoreactive framework structure 120 and corner foam parts 125A via sliding plane 140, when side wings 101 move.

In FIG. 13A, cushion element 131, as already shown in FIG. 8A, lies in a plane, when viewed in the x-direction, in front of autoreactive framework structure 120 with the difference that cushion element 131 now slightly projects from the z/y plane, therefore slightly raised, by corner foam parts 125A in the bottom corners.

In FIG. 13B in a perspective top view, from the front, of front side 120V of head restraint 100, a cushion element 131 is also presented, which as already shown in FIG. 8A is arranged in a plane, viewed in the x-direction, in front of autoreactive framework structure 120. Cushion element 131 is shown perspectively in FIG. 13B and as a section through head restraint 100 in FIG. 8A and in the following FIG. 14A.

FIG. 13B clarifies an embodiment variant in which cushion element 131 comprises a plurality of foam parts 125C and 125B or 125V and 125A.

In the shown design form, foam parts 125C, 125B or 125C, 125A lie on autoreactive framework structure 120. Sliding plane 140 lies between autoreactive framework structure 120 and multi-part cushion element 131.

Cushion element 131 is formed as a cut foam part comprising a number of foam parts. Foam parts 125C, 125B or 125C, 125A are glued together in the plane (according to FIG. 13B in the z/y plane) and are held together by a cover not shown in greater detail in FIG. 13B, whereby the cover surrounds preferably at the same time autoreactive framework structure 120.

In the shown exemplary embodiment, cushion element 131 is formed as central middle foam part 125C, which is surrounded by edge foam parts 125B, which in each case form the lateral edge and the bottom corners of cushion element 131.

Optionally (not shown) a central middle foam part 125C is provided together with corner foam parts 125A arranged on both sides, so that the middle foam part 125C is taken to the edge and is supplemented by corner foam parts 125A only in the bottom corners.

In starting position I, the middle foam part 125C and edge foam parts 125B lie in the same z/y plane or the edge foam parts 125B slightly project, —raised—, from the z/y plane.

In the optional arrangement of corner foam parts 125A, the bottom corners also lie in the z/y plane or are formed, raised, similar to edge foam parts 125B and even in the starting position I of framework structure 120 emerge from the z/y plane.

As a result, a contact area 126 of head restraint 100 is already formed in starting position I; in said contact area the edge regions and the bottom corners or only the bottom corners project slightly. This effect is retained during movement of side wings 101 of head restraint 100 from starting position I to the adjusted slumber or crash position II.

This comfortable design with raised areas is popular among users. In this type of design, head restraint 100 as already mentioned is called a "neck pillow" head restraint. Edge foam parts 125B or corner foam parts 125A at the edge and/or the bottom corners form the cushioned collar, similar to the neck pillow.

It is provided in addition to make middle foam part 125C from a soft foam and edge foam parts 125B or corner foam parts 125A from a harder foam. The effect is that the softer foam easily conforms to the head shape of the back of head K, whereby the harder inflexible foam assures the lateral support of head K, and improves the experienced comfort and enables a fold-minimized cover structure at the edge and/or corner area of cushion element 131.

In addition, a softer and harder viscoelastic foam is used as the foam. Middle foam part 125C is formed of a soft viscoelastic foam and edge foam parts 125B or corner foam parts 125A are formed of a harder viscoelastic foam. Viscoelastic foam reacts advantageously still better than non-viscoelastic foam to the individual head shape and conforms perfectly to the head shape in an advantageous manner. The viscoelastic foam provides a demonstrable high pressure relief, both at a low and high weight load. The soft and hard viscoelastic foam reacts optimally during normal use or in a crash and distributes the pressure within cushion element 131 depending on the acting force with prevention of pressure points.

Figure 14B:
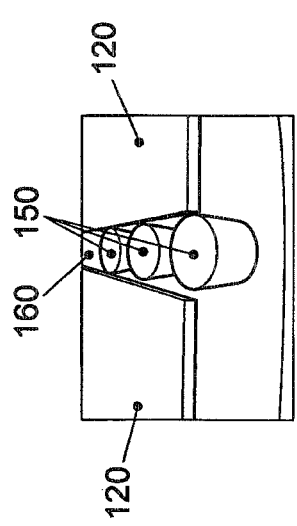
FIGS. 14A, 14B, and 14C are a section and illustrations of the head restraint, which comprises side wings as the autoreactive framework structure, for clarifying the effect on the functional experience of the head restraint due to the use of viscoelastic foam.
Figure 14C:
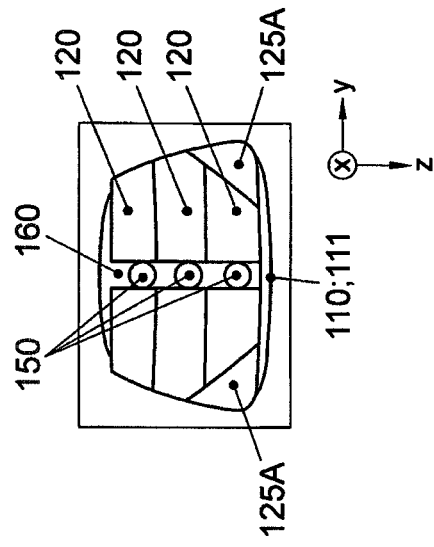
Figure 14A:
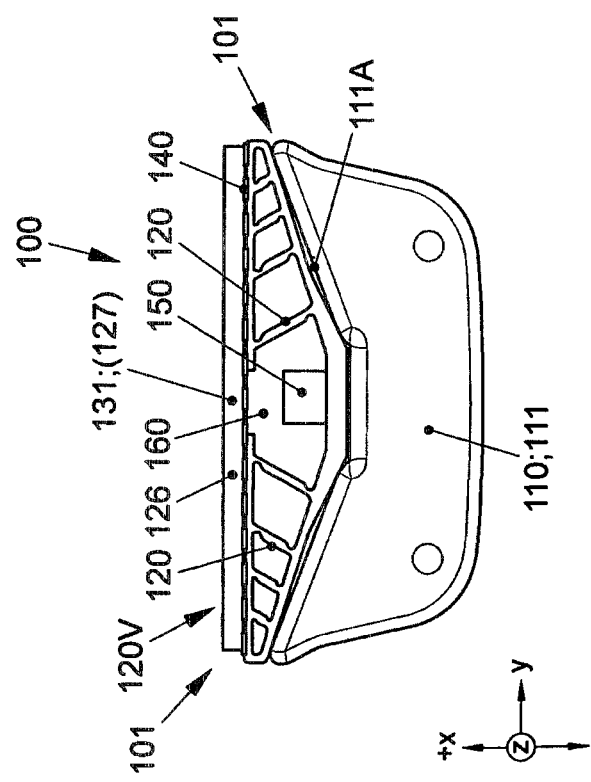

FIGS. 14A to 14C illustrate a design variant which influences the functional experience of the user of head restraint 100 of a vehicle seat in an advantageous manner. FIG. 14A corresponds to FIG. 8A. Absorbing element 150 was already presented in the description to FIG. 8A.

In order to make the adjustment movement of side wings 101 as uniform as possible, it is proposed to form the foam arranged on or bonded to the inner side of cover 127 of cushion elements 131 as a viscoelastic foam.

The foam can be bonded to the back of cover 127 or sewn onto the back of cover 127. The foam can also lie loosely below cover 127 on framework structure 120.

The use of a viscoelastic foam offers the advantage that the viscoelastic foam produces a high resistance in the case of a rapid and large action of force F on the head restraint in the −x-direction. In contrast, in the case of a slow and small action of force F, the viscoelastic foam is barely perceptible. The viscoelastic foam then creates only a small resistance.

In the adjustment movement of side wings 101 of autoreactive framework structure 120 from the starting position to the comfort position, an equalization of the adjustment movement results in principle due to the viscoelastic foam. The comfort position does not occur abruptly upon impact of the force F, because the viscoelastic foam depending on the acting force F equalizes the adjustment movement.

During movement of the occupant's head K in the direction of head restraint 100, the back of head K forms a contact area 126 on head restraint 100. A point of impact P and an area of impact A were already defined in the description of the basic principle. At least the one already mentioned absorbing element 150 is arranged in this area.

In the exemplary embodiment, three absorbing elements 150 are arranged which are also formed as a so-called "pressure mushroom." Said absorbing elements 150 are also formed of foam, whereby it is also proposed in an advantageous manner to use a viscoelastic foam, as a result of which the previously described advantages take effect also in the area of impact A or the point of impact P of head K on head restraint 100. FIGS. 14A to 14C each show absorbing elements 150, which are arranged in framework structure 120. Framework structure 120 in the front area forms a gap 160, via which absorbing elements 150 are accessible, so that in addition to the absorbing properties of cushion element 131, the back of head K strikes absorbing elements 150 that exhibit a further absorbing effect.

A pleasant absorbing action arises when head K strikes the head restraint. The accessibility of head K to absorbing elements 150 is assured by the already described opening, in particularly gap 160, provided in the framework structure.

Figure 15A:
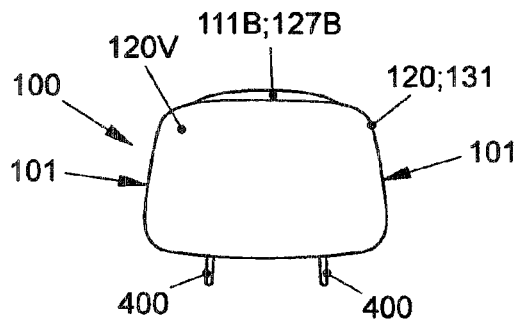
FIGS. 15A to 15E are perspective exterior views of the head restraint with side wings formed as the autoreactive framework structure in a first product design variant.
Figure 15B:
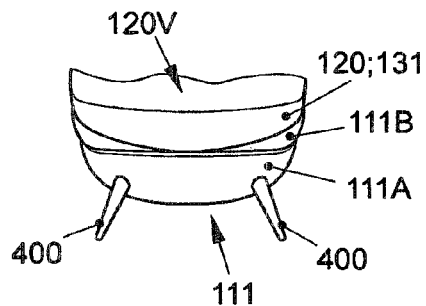
Figure 15D:
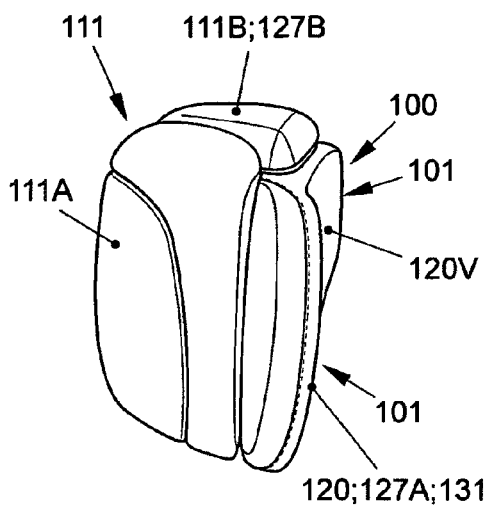
Figure 15C:
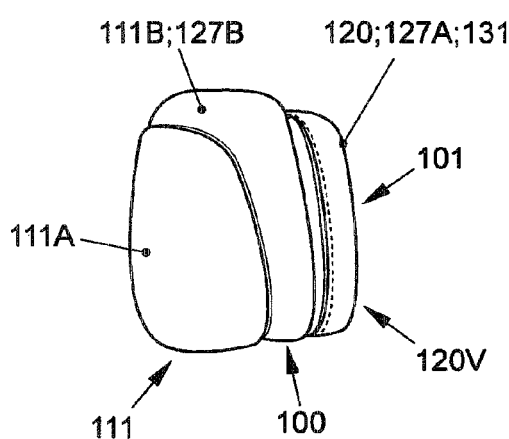
Figure 15E:
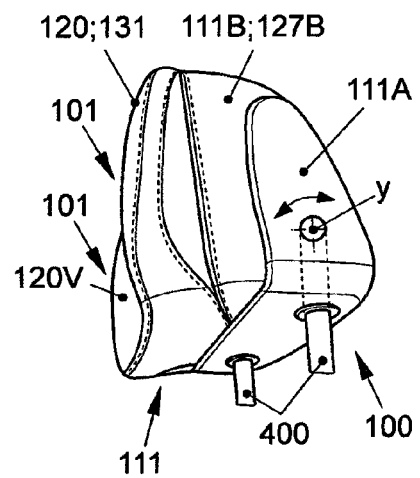

FIGS. 15A to 15E show in different views a head restraint 100 in a first product design variant. FIG. 15A shows a front view, whereas FIG. 15B shows a bottom view of head restraint 100. FIGS. 15C to 15E show side views, whereby the particular front side is provided with the reference character 120V. Head restraint 100 comprises a head box 111, which is support structure 110 for framework structure 120 or in whose hollow space a support structure 110 is formed. Head box 111 serves simultaneously to attach support rods 400 of head restraint 100.

Head box 111 has a base part 111A and an intermediate part 111B. In the shown embodiment, base part 111A is a plastic part, which is not provided with a cover. Intermediate part 111B is a foam part, which is provided with a second cover part 127B or it is also designed as a solid head box, which is provided only with a cover 127B or with foam bonded to the inner side of cover 127B. Intermediate part 111B lies in part within base part 111A and is connected in a suitable manner to base part 111A.

Autoreactive framework structure 120 with adjustable side wings 101 is arranged on front side 120A of head restraint 100. Cushion element 131, which has already been described in detail, is arranged on autoreactive framework structure 120.

Framework structure 120 and cushion element 131 in the preferred embodiment according to the left illustration of FIG. 10B form a separate "fin ray cushion element" 120, 131, which is provided with a first cover part 127A. The separate embodiment of "fin ray cushion element" 120, 131 makes it possible that "fin ray cushion element" 120, 131 can be formed to be optionally removable. The described fixation 170 to head restraint 100 is designed detachable to assure removal. "Fin ray cushion element" 120, 131 can be separated from head box 111 in this design of intermediate part 111B and be used as a head pillow. A corresponding mounting for attaching or removing "fin ray cushion element" 120, 131 is provided in head box 111 either on intermediate part 111B and/or on base part 111A.

Figure 16A:
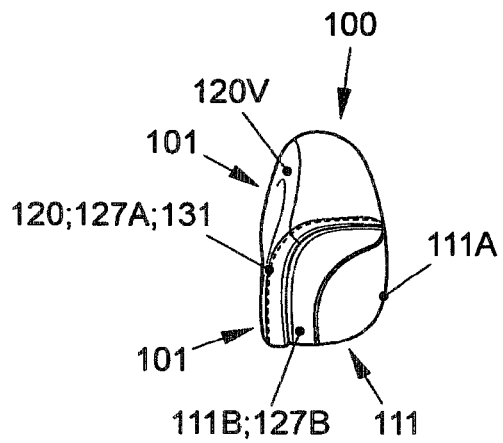
FIGS. 16A to 16D are perspective exterior views of the head restraint with side wings formed as the autoreactive framework structure in a second product design variant.
Figure 16B:
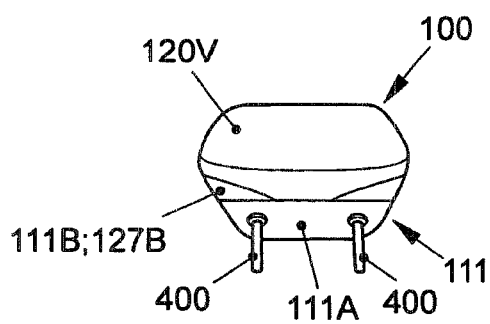
Figure 16D:
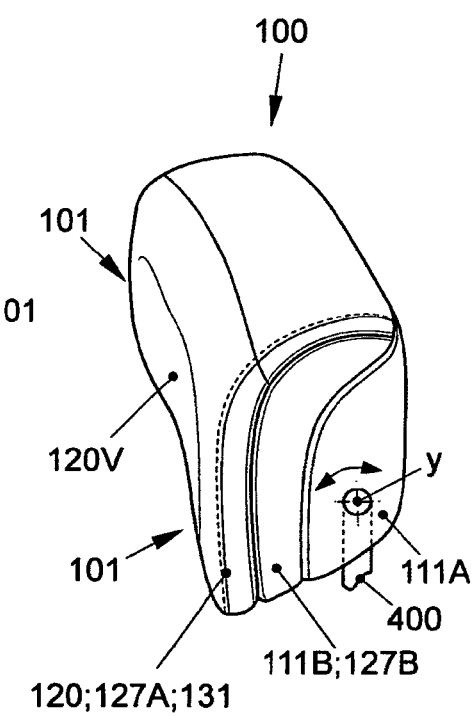
Figure 16C:
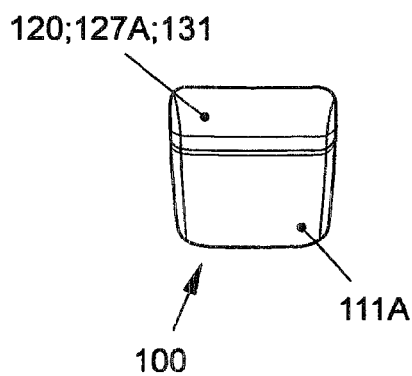

FIGS. 16A to 16D show in different views a head restraint 100 in a second product design variant. FIG. 16A shows a front view, whereas FIG. 16B shows a bottom view of head restraint 100. FIG. 16C shows a back view and FIG. 16D a side view, whereby the particular front side is provided with the reference character 120V.

Head restraint 100 also comprises a head box 111, which represents support structure 110 for framework structure 120. Head box 111 serves simultaneously to attach support rods 400 of head restraint 100. Head box 111 also has a base part 111A (without cover) and an intermediate part 111B with a second cover part 127B. Intermediate part 111B in this embodiment variant as well lies partially within base part 111A and is connected to base part 111A in a suitable way.

The difference to the first product design variant is that cushion element 120, 131 with first cover part 127A analogous to the right illustration according to FIG. 10B is placed around the top part of intermediate part 111B of head box 111. This cushion element 120, 131 guided over intermediate part 111B and placed on intermediate part 111B can optionally also be designed to be removable and to be used as a head pillow.

Exemplary solutions are presented in FIGS. 17, 18, and 19 for increasing the adjustment path of side wings 101 from the starting position to the comfort position.

Side wings 101 of framework structures 120 are shown schematically in FIGS. 17, 18, and 19.

A first embodiment option, which will be clarified with the two top illustrations in FIG. 17, comprises integrating in bottom area 122A a reinforcement structure 300 in the fashion of a diamond structure 310 into framework structure 120. Upon action of a force F in the −x-direction, diamond structure 310, according to the second illustration from the top, gives way laterally and side wings 101 arranged on diamond structure 310 are set more greatly into the comfort position compared with the previously described framework structures 120.

A second embodiment option according to FIG. 17, third illustration from the top, comprises forming reinforcement structure 300 in a variation of several diamond structures 110.

A third embodiment option comprises forming reinforcement structure 300 as a hexahedral structure 320, whereby the same previously described effect can be achieved with the aid of hexahedral structure 320.

FIG. 18 shows further embodiment options for increasing the adjustment path of side wings 101 into the comfort position. A reinforcement structure 300, again arranged in bottom area 122A, according to the top illustration of FIG. 18, is formed with pre-bent bars 330. In the case of an action of force F in the −x-direction, according to the middle illustration of FIG. 18, in this fourth embodiment option, first pre-bent bars 330 rise up, as a result of which side wings 101 of framework structure 120 are then raised more greatly than without such a reinforcement structure 300 with a pre-bent bar 330 or pre-bent bars 330.

A fifth embodiment option is clarified by the bottom illustration of FIG. 18. In this case, cross struts 123 (cross ribs) between flexurally elastic flanks 121, 122 (straps) are pre-bent. In the case of the action of force F in the −x-direction, first cross struts 123 release their pretension force and, as described in relation to FIG. 11, lie against flexurally elastic flanks 121, 122, whereupon cross struts 123 that were not pre-bent also carry out the autoreactive adjustment movement of framework structure 120 into the comfort position, whereby the adjustment path is increased compared with a realization without pre-bent cross struts 123.

A sixth embodiment option is clarified by the top figures of FIG. 19. The sixth embodiment option comprises arranging as reinforcement structure 300 a four-link structure 350 in bottom area 122A of the framework structure. In this sixth embodiment option, the advantageous effect also results that with force action F in the −x-direction the obtuse angle of side wing 101 penetrates four-link structure 350, as a result of which side wing(s) 101 is/are placed overall more greatly into the comfort position.

A seventh embodiment option is shown in the third illustration from the top in FIG. 19. Reinforcement structure 300 in this embodiment option is formed of two four-link structures 350.

Finally, in the bottom illustration of FIG. 19, a reinforcement structure 300 is proposed, which is a combination of a diamond structure 310 and a four-link structure. In the bottom illustration of FIG. 19, it becomes clear that during the action of a force F in the −x-direction penetration of diamond structure 310 into four-link structure 350 occurs, whereby diamond structure 310, as described for FIG. 17, gives way laterally and simultaneously penetrates four-link structure 350, as a result of which the advantageous effect of the increase in the adjustment path is caused by overlaying of the described actions, effected by means of diamond structure 310 and four-link structure 350.

FIG. 15E and FIG. 16D clarify further that head restraint 100 in a first embodiment is arranged pivotable on a head restraint pivot axis Y relative to a backrest according to the arrows in FIGS. 15E and 16D, so that the position of head restraint 100 relative to the backrest and thereby the position of framework structure 120 depending on the backrest tilt can be adjusted further manually or automatically.

In another second embodiment (not shown), it is provided that framework structure 120 relative to support element 110A is arranged pivotable on a framework structure pivot axis, whereby the position of framework structure 120 relative to support element 110A and thereby relative to the backrest can be adjusted further manually or automatically also depending on the backrest tilt. In both embodiments, it is provided in an advantageous manner that framework structure 120 is always arranged in a more optimal position to the head position dependent on the backrest tilt. In other words, contact area 126 without striking the back of head K depending on the backrest tilt is changed in its orientation so that before striking the back of head K an optimized orientation of contact area 126 of head restraint 100 is already provided for.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A head restraint, comprising:
   a support structure; and
   at least one framework structure, the framework structure comprising:
      flexurally elastic flanks, the flexurally elastic flanks defining a front plate and a rear plate of the at least one framework structure; and
      deflectable cross struts enclosed between the flanks and are arranged on the flanks via an elastic connector, as a result of which a force pulse which acts on the cross struts of the at least one framework structure via one of the flexurally elastic flanks and which acts on a front side of the at least one framework structure from one direction causes a compensating, autoreactive deformation of the at least one framework structure at another point in an opposite direction.

2. The head restraint according to claim 1, wherein a force acting in a direction generates the force pulse, which is transmitted via a person's head with a formation of a point of impact of the head or an area of impact of the head on a front side of the framework structure and causes an adjustment of the head restraint at another point, in a horizontal line transverse to the direction of the acting force, at least on one side to the side of the point of impact or an area of impact of the force pulse in an opposite direction.

3. The head restraint according to claim 1, wherein the flexurally elastic flanks of the at least one framework structure in the head restraint are arranged transverse to the direction of the force producing the force pulse.

4. The head restraint according to claim 1, wherein the cross struts of the at least one framework structure in the head restraint are arranged substantially in a vertical direction in a vertical line transverse to the direction of the force producing the force pulse.

5. The head restraint according to claim 1, wherein the flexurally elastic flanks of the at least one framework structure are connected at least partially to the support structure.

6. The head restraint according to claim 1, wherein the at least one framework structure has a triangular or rectangular shape, and wherein a plurality of framework structures of the same shape or different shapes are assembled to form a multi-framework structure.

7. The head restraint according to claim 1, wherein the at least one framework structure connected to the support structure of the head restraint is arranged on a backrest via support rods connected to the support structure as a single head restraint or wherein the at least one framework structure is integrated into a structure of a backrest.

8. The head restraint according to claim 1, wherein the at least one framework structure is used to form side wings arranged on a support element of the support structure, and wherein the side wings are configured to be brought autoreactively out of a starting position into a comfort position and back in a direction of travel.

9. The head restraint according to claim 8, wherein a cushion element is arranged on the front side of the head restraint on the framework structure forming the side wings, and wherein, between a back of the cushion element and a front side of the framework structure of the side wings, a sliding plane is formed, in which the facing and adjacent areas form a friction pair.

10. The head restraint according to claim 9, wherein the framework structure of the side wings and the cushion element are formed as separate fin ray cushion elements that are separable from the head restraint.

11. The head restraint according to claim 9, wherein a cushion element, which is a foam part provided with a cover, is arranged on the framework structure.

12. The head restraint according to claim 11, wherein the foam part comprises a middle foam part and each side wing an edge foam part or a corner foam part.

13. The head restraint according to claim 12, wherein the middle foam part is made of a softer foam and wherein the edge foam part or the corner foam part is of a harder foam compared with the softer foam.

14. The head restraint according to claim 13, wherein the middle foam part is made of a softer viscoelastic foam and wherein the edge foam part or the corner foam part is made of a harder viscoelastic foam compared with the softer viscoelastic foam.

15. The head restraint according to claim 8, wherein the support structure for receiving the framework structure of the side wings has a trough-shaped formation.

16. The head restraint according to claim 8, wherein the framework structure of the side wings in their starting position forms a contact area for the head in a V-shape.

17. The head restraint according to claim 8, wherein the framework structure of the side wings in their starting position forms a contact area for the head in a V-shape, and wherein the side wings of the framework structure in their starting position lie in a plane, and wherein, at least in a bottom area of the side wings on the framework structure, at least one foam part is arranged.

18. The head restraint according to claim 8, wherein a bottom area of the framework structure of the side wings is made reinforced or has a stiffener.

19. The head restraint according to claim 8, wherein at least one corner foam part is arranged on the framework structure of each side wing, as a result of which in a starting position, in which the side wings lie in a plane, a dishing of the contact area of an occupant's head is effected.

20. The head restraint according to claim 8, wherein a sliding plane is formed between the framework structure and the cushion element, wherein the sliding plane is arranged between a rear side of the cushion element and a front side of the framework structure of the side wings.

21. The head restraint according to claim 8, wherein the side wings formed as the framework structure on the front side of the framework structure in the area of the central axis have an opening in which an absorbing element accessible from the front side is arranged, which is a foam part, and wherein a viscoelastic foam is used.

22. The head restraint according to claim 8, wherein the framework structure of the side wings has reinforcing elements.

23. The head restraint according to claim 1, wherein the deflectable cross struts, lying between the flexurally elastic flanks close to the flexurally elastic flanks, form hinge sites or joint sites.

24. The head restraint according to claim 1, wherein, proceeding from an axially symmetric central axis, a distance or length of the cross struts, oriented vertically between the flexurally elastic flanks in a normal installation state of the head restraint, decrease from an inside to an outside.

25. The head restraint according to claim 1, wherein the head restraint is arranged pivotable on a head restraint pivot axis relative to a backrest, and wherein the position of the head restraint relative to the backrest and thereby a position of the framework structure, depending on the backrest tilt, is configured to be adjusted further manually or automatically.

26. The head restraint according to claim 1, wherein the support structure is attached to a backrest,
wherein the framework structure is arranged pivotable on a framework structure pivot axis relative to the support structure, and
wherein the position of the framework structure relative to the support element and thereby relative to the backrest depending on the backrest tilt is configured to be adjusted further manually or automatically.

* * * * *